US012496245B2

(12) United States Patent
Augustine et al.

(10) Patent No.: US 12,496,245 B2
(45) Date of Patent: *Dec. 16, 2025

(54) PATIENT SECUREMENT SYSTEM FOR THE SURGICAL TRENDELENBURG POSITION

(71) Applicant: Augustine Biomedical and Design, LLC, Eden Prairie, MN (US)

(72) Inventors: Scott D. Augustine, Deephaven, MN (US); Ryan S. Augustine, Minneapolis, MN (US); Brent M. Augustine, Chanhassen, MN (US); Garrett J. Augustine, Long Lake, MN (US); Susan D. Augustine, Deephaven, MN (US); Randall C. Arnold, Minnetonka, MN (US); John R. Beckman, St. Louis Park, MN (US); John J. Cardwell, Minneapolis, MN (US)

(73) Assignee: Augustine Biomedical and Design, LLC, Eden Prairie, MN (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/502,542

(22) Filed: Nov. 6, 2023

(65) Prior Publication Data

US 2024/0065916 A1 Feb. 29, 2024

Related U.S. Application Data

(63) Continuation of application No. 17/896,456, filed on Aug. 26, 2022, now Pat. No. 11,844,733.

(Continued)

(51) Int. Cl.

*A61G 13/00* (2006.01)
*A61G 13/12* (2006.01)

(52) U.S. Cl.

CPC ....... *A61G 13/1285* (2013.01); *A61G 13/125* (2013.01); *A61G 13/126* (2013.01)

(58) Field of Classification Search

CPC .... A61F 2013/15073; A61F 2013/5661; A61F 2013/5672; A61F 2013/5677;

(Continued)

(56) References Cited

U.S. PATENT DOCUMENTS

| | | | |
|---|---|---|---|
| 2,140,213 | A | 12/1938 | Tegarty |
| 2,403,676 | A | 7/1946 | Modlinski |

(Continued)

FOREIGN PATENT DOCUMENTS

| | | | |
|---|---|---|---|
| CA | 3019306 | A1 | 10/2017 |
| DE | 3343664 | C1 | 3/1985 |

(Continued)

OTHER PUBLICATIONS

Moritz and Henriques, "Studies of Thermal Injury: The Relative Importance of Time and Surface Temperature in the Causation of Cutaneous Burns," Am. J. Pathology, vol. 23, 1947, pp. 695-720.

(Continued)

*Primary Examiner* — Adam Baker

(74) *Attorney, Agent, or Firm* — Fredrikson & Byron, P.A.

(57) ABSTRACT

A patient securing overlay includes a sheet of fabric configured to support a patient's torso on a surgical table. The sheet of fabric includes friction enhancing elements applied to at least a portion of an upper surface. The sheet of fabric is attached near its side edges to two or more side flaps that extend laterally outward from the side edges of the sheet of fabric. Each of the side flaps is attached to the surgical table at two or more attachment points. A distance between adjacent attachment points is greater than a distance between an attachment point and the sheet of fabric in order to (Continued)

naturally create a favorable retaining force vector angle of less than 45° between the attachment point and the sheet of fabric.

30 Claims, 26 Drawing Sheets

Related U.S. Application Data

(60) Provisional application No. 63/354,778, filed on Jun. 23, 2022.

(58) Field of Classification Search
CPC .......... A61F 2013/582; A61F 2013/583; A61F 2013/586; A61F 2013/587; A61F 13/56; A61F 13/58; A61F 13/581; A61F 13/62; A61F 13/622; A61F 13/625; A61F 13/627; A61F 13/64; A61F 5/37; A61F 5/3769; A61F 5/3776; A61F 5/3792; A47C 21/02; A47C 21/022; A47C 21/024; A47C 21/06; A61G 13/04; A61G 13/12–1255; A61G 13/122; A61G 13/123; A61G 13/1225; A61G 13/126; A61G 7/0503; A61G 7/0504; A61G 7/057; A61G 7/065; A61G 7/07
USPC .................................................. 128/889, 849
See application file for complete search history.

(56) References Cited

U.S. PATENT DOCUMENTS

| | | | |
|---|---|---|---|
| 2,497,186 | A | 2/1950 | Pedersen |
| 2,635,175 | A | 4/1953 | Wilson |
| 2,706,768 | A | 4/1955 | Julius |
| 2,715,674 | A | 8/1955 | Abbott et al. |
| 2,873,352 | A | 2/1959 | Franco |
| 2,948,802 | A | 8/1960 | Shaw |
| 2,982,976 | A | 5/1961 | Ferolito |
| 3,008,152 | A | 11/1961 | Seidenberg |
| 3,134,891 | A | 5/1964 | Marina |
| 3,137,871 | A | 6/1964 | Florio |
| 3,340,549 | A | 9/1967 | Gerd |
| 3,380,087 | A | 4/1968 | Petty et al. |
| 3,423,574 | A | 1/1969 | Shomphe et al. |
| 3,548,147 | A | 12/1970 | Owers |
| 3,582,456 | A | 6/1971 | Stolki |
| 3,634,655 | A | 1/1972 | Jordan |
| 3,690,325 | A | 9/1972 | Kenny |
| 3,780,262 | A | 12/1973 | Rudd |
| 3,808,403 | A | 4/1974 | Gunma et al. |
| 3,839,621 | A | 10/1974 | Hariu |
| 3,854,156 | A | 12/1974 | Williams |
| 3,874,504 | A | 4/1975 | Verakas |
| 3,900,654 | A | 8/1975 | Stinger |
| 3,936,661 | A | 2/1976 | Furuishi et al. |
| 4,061,898 | A | 12/1977 | Murray et al. |
| 4,118,531 | A | 10/1978 | Hauser |
| 4,149,066 | A | 4/1979 | Niibe |
| 4,186,294 | A | 1/1980 | Bender |
| 4,250,398 | A | 2/1981 | De Fonso et al. |
| 4,270,040 | A | 5/1981 | Mcmullan et al. |
| 4,358,668 | A | 11/1982 | Mcmullan et al. |
| 4,363,947 | A | 12/1982 | Bergersen |
| 4,423,308 | A | 12/1983 | Callaway et al. |
| 4,479,795 | A | 10/1984 | Mustacich et al. |
| 4,495,402 | A | 1/1985 | Burdick et al. |
| 4,534,886 | A | 8/1985 | Kraus et al. |
| 4,536,433 | A | 8/1985 | Sagi et al. |
| 4,582,564 | A | 4/1986 | Shanefield et al. |
| 4,626,664 | A | 12/1986 | Grise |
| 4,658,119 | A | 4/1987 | Endo et al. |
| 4,660,388 | A | 4/1987 | Greene, Jr. |
| 4,661,689 | A | 4/1987 | Harrison |
| 4,676,247 | A | 6/1987 | Van Cleve |
| 4,682,447 | A | 7/1987 | Osborn |
| 4,691,762 | A | 9/1987 | Elkins et al. |
| 4,719,335 | A | 1/1988 | Batliwalla et al. |
| 4,747,409 | A | 5/1988 | Silen |
| 4,764,665 | A | 8/1988 | Orban et al. |
| 4,798,936 | A | 1/1989 | Johnson, Sr. |
| 4,899,749 | A | 2/1990 | Laroco |
| 4,912,306 | A | 3/1990 | Grise et al. |
| 4,930,317 | A | 6/1990 | Klein |
| 4,941,961 | A | 7/1990 | Noguchi et al. |
| 4,989,283 | A | 2/1991 | Krouskop |
| 4,991,242 | A | 2/1991 | Brown |
| 5,008,515 | A | 4/1991 | Mccormack |
| 5,010,233 | A | 4/1991 | Henschen et al. |
| 5,023,433 | A | 6/1991 | Gordon |
| 5,032,705 | A | 7/1991 | Batcheller et al. |
| 5,072,598 | A | 12/1991 | Dibrell |
| 5,074,285 | A | 12/1991 | Wright |
| 5,086,629 | A | 2/1992 | Dibrell |
| 5,148,002 | A | 9/1992 | Kuo et al. |
| 5,179,743 | A | 1/1993 | Lanman |
| 5,255,390 | A | 10/1993 | Gross et al. |
| 5,320,164 | A | 6/1994 | Szczesuil et al. |
| 5,352,870 | A | 10/1994 | Daugherty et al. |
| 5,380,580 | A | 1/1995 | Rogers et al. |
| 5,383,918 | A | 1/1995 | Panetta |
| 5,395,399 | A | 3/1995 | Rosenwald |
| 5,422,462 | A | 6/1995 | Kishimoto |
| 5,443,056 | A | 8/1995 | Smith et al. |
| 5,473,783 | A | 12/1995 | Allen |
| 5,496,358 | A | 3/1996 | Rosenwald |
| 5,534,021 | A | 7/1996 | Dvoretzky |
| 5,605,144 | A | 2/1997 | Simmons |
| 5,638,438 | A | 6/1997 | Keen |
| 5,704,081 | A | 1/1998 | Bollinger |
| 5,723,845 | A | 3/1998 | Partington et al. |
| 5,755,275 | A | 5/1998 | Rose et al. |
| 5,773,275 | A | 6/1998 | Anderson et al. |
| 5,815,864 | A | 10/1998 | Sloop |
| 5,817,145 | A | 10/1998 | Augustine et al. |
| 5,824,996 | A | 10/1998 | Kochman et al. |
| 5,835,983 | A | 11/1998 | Mcmahen et al. |
| 5,878,620 | A | 3/1999 | Gilbert et al. |
| 5,881,410 | A | 3/1999 | Yamada |
| 5,895,973 | A | 4/1999 | Fessenden |
| 5,928,274 | A | 7/1999 | Augustine |
| 5,932,129 | A | 8/1999 | Hyatt |
| 5,948,303 | A | 9/1999 | Larson |
| 5,964,792 | A | 10/1999 | Augustine |
| 5,966,763 | A | 10/1999 | Thomas et al. |
| 5,970,542 | A | 10/1999 | Mays |
| 5,974,605 | A | 11/1999 | Dickerhoff et al. |
| 5,986,243 | A | 11/1999 | Campf |
| 6,030,412 | A | 2/2000 | Klatz et al. |
| 6,038,722 | A | 3/2000 | Giori et al. |
| 6,053,910 | A | 4/2000 | Fleenor |
| 6,054,331 | A | 4/2000 | Woo et al. |
| 6,078,026 | A | 6/2000 | West |
| 6,084,217 | A | 7/2000 | Bulgajewski |
| 6,093,910 | A | 7/2000 | Mcclintock et al. |
| 6,147,333 | A | 11/2000 | Mattson |
| 6,149,674 | A | 11/2000 | Borders |
| 6,172,344 | B1 | 1/2001 | Gordon et al. |
| 6,180,929 | B1 | 1/2001 | Pearce |
| 6,184,496 | B1 | 2/2001 | Pearce |
| 6,189,487 | B1 | 2/2001 | Owen et al. |
| 6,210,427 | B1 | 4/2001 | Augustine et al. |
| 6,214,000 | B1 | 4/2001 | Fleenor et al. |
| 6,215,111 | B1 | 4/2001 | Rock et al. |
| 6,229,123 | B1 | 5/2001 | Kochman et al. |
| 6,229,126 | B1 | 5/2001 | Ulrich et al. |
| 6,235,049 | B1 | 5/2001 | Nazerian |
| 6,240,623 | B1 | 6/2001 | Johansson |
| 6,292,957 | B1 | 9/2001 | Thompson |
| 6,348,678 | B1 | 2/2002 | Loyd et al. |
| 6,373,034 | B1 | 4/2002 | Rock et al. |
| 6,403,935 | B2 | 6/2002 | Kochman et al. |
| 6,416,534 | B1 | 7/2002 | Montagnino et al. |

(56) References Cited

U.S. PATENT DOCUMENTS

| | | | |
|---|---|---|---|
| 6,434,328 | B2 | 8/2002 | Rutherford |
| 6,452,138 | B1 | 9/2002 | Kochman et al. |
| 6,452,139 | B1 | 9/2002 | Benoit et al. |
| 6,483,087 | B2 | 11/2002 | Gardner et al. |
| 6,493,889 | B2 | 12/2002 | Kocurek |
| 6,544,258 | B2 | 4/2003 | Fleenor et al. |
| 6,565,593 | B2 | 5/2003 | Diana |
| 6,578,219 | B1 | 6/2003 | Gabel et al. |
| 6,582,456 | B1 | 6/2003 | Hand et al. |
| 6,705,388 | B1 | 3/2004 | Sorgo |
| 6,713,733 | B2 | 3/2004 | Kochman et al. |
| 6,723,115 | B1 | 4/2004 | Daly |
| 6,728,978 | B1 | 5/2004 | Nordin |
| 6,730,115 | B1 | 5/2004 | Heaton |
| 6,755,852 | B2 | 6/2004 | Lachenbruch et al. |
| 6,770,848 | B2 | 8/2004 | Haas et al. |
| 6,770,854 | B1 | 8/2004 | Keane |
| 6,839,922 | B1 | 1/2005 | Foggett et al. |
| 6,872,758 | B2 | 3/2005 | Simpson et al. |
| 6,924,467 | B2 | 8/2005 | Ellis et al. |
| 6,933,469 | B2 | 8/2005 | Ellis et al. |
| 6,961,969 | B2 | 11/2005 | Nichols |
| 6,967,309 | B2 | 11/2005 | Wyatt et al. |
| 6,974,935 | B2 | 12/2005 | O'Grady |
| 7,013,509 | B2 | 3/2006 | Hickman |
| 7,020,912 | B2 | 4/2006 | Berge |
| 7,022,950 | B2 | 4/2006 | Haas et al. |
| 7,049,559 | B2 | 5/2006 | Ishii et al. |
| 7,053,344 | B1 | 5/2006 | Surjan et al. |
| 7,107,629 | B2 | 9/2006 | Miros et al. |
| 7,161,120 | B1 | 1/2007 | Stroud et al. |
| 7,176,419 | B2 | 2/2007 | Ellis et al. |
| 7,181,790 | B2 | 2/2007 | Wirtz |
| 7,183,524 | B2 | 2/2007 | Naylor et al. |
| 7,228,578 | B2 | 6/2007 | Linnane |
| 7,268,320 | B2 | 9/2007 | Rock et al. |
| 7,282,676 | B1 | 10/2007 | Bouchier et al. |
| 7,287,289 | B1 | 10/2007 | Hagopian |
| 7,375,308 | B2 | 5/2008 | Ferguson |
| 7,543,344 | B2 | 6/2009 | Augustine et al. |
| 7,714,255 | B2 | 5/2010 | Augustine et al. |
| 7,851,729 | B2 | 12/2010 | Augustine et al. |
| 8,062,343 | B2 | 11/2011 | Augustine et al. |
| 8,065,763 | B2 | 11/2011 | Brykalski et al. |
| 8,084,722 | B2 | 12/2011 | Haas et al. |
| 8,170,685 | B2 | 5/2012 | Docherty et al. |
| 8,283,602 | B2 | 10/2012 | Augustine et al. |
| 8,288,693 | B2 | 10/2012 | Weiss et al. |
| 8,291,612 | B2 | 10/2012 | Ferguson |
| 8,418,297 | B2 | 4/2013 | Mikkelsen et al. |
| 8,464,720 | B1 | 6/2013 | Pigazzi et al. |
| 8,511,314 | B2 | 8/2013 | Pigazzi et al. |
| 8,604,391 | B2 | 12/2013 | Augustine et al. |
| 8,624,164 | B2 | 1/2014 | Deibel et al. |
| 8,698,044 | B2 | 4/2014 | Burr et al. |
| 8,772,676 | B2 | 7/2014 | Augustine et al. |
| 8,876,812 | B2 | 11/2014 | Aramayo |
| 9,161,876 | B2 | 10/2015 | Pigazzi et al. |
| 9,375,343 | B2 | 6/2016 | Marshall et al. |
| 9,750,656 | B1 | 9/2017 | Pigazzi et al. |
| 9,782,287 | B2 | 10/2017 | Pigazzi et al. |
| 9,931,262 | B2 | 4/2018 | Pigazzi et al. |
| 9,945,080 | B2 | 4/2018 | Caterina et al. |
| 9,949,883 | B1 | 4/2018 | Pigazzi et al. |
| 9,962,122 | B2 | 5/2018 | Augustine et al. |
| 10,045,902 | B1 | 8/2018 | Pigazzi et al. |
| 10,201,935 | B2 | 2/2019 | Augustine et al. |
| 10,206,248 | B2 | 2/2019 | Augustine et al. |
| 10,413,469 | B2 | 9/2019 | Chua |
| 10,765,580 | B1 | 9/2020 | Augustine |
| 10,959,675 | B2 | 3/2021 | Augustine et al. |
| 10,980,694 | B2 | 4/2021 | Augustine |
| 10,993,866 | B2 | 5/2021 | Augustine |
| 11,026,856 | B1 | 6/2021 | Bergad |
| 11,103,188 | B2 | 8/2021 | Augustine et al. |
| 11,278,463 | B2 | 3/2022 | Augustine |
| 2001/0020303 | A1 | 9/2001 | Endo et al. |
| 2001/0040014 | A1 | 11/2001 | Green et al. |
| 2001/0044971 | A1 | 11/2001 | Borders et al. |
| 2002/0005398 | A1 | 1/2002 | Gillner et al. |
| 2002/0018877 | A1 | 2/2002 | Woodall et al. |
| 2002/0047007 | A1 | 4/2002 | Loyd, Sr. et al. |
| 2002/0073489 | A1 | 6/2002 | Totton et al. |
| 2002/0117495 | A1 | 8/2002 | Kochman et al. |
| 2002/0124312 | A1 | 9/2002 | Yoon |
| 2003/0023292 | A1 | 1/2003 | Gammons et al. |
| 2003/0069621 | A1 | 4/2003 | Kushnir |
| 2003/0091889 | A1 | 5/2003 | Sotomura et al. |
| 2003/0192121 | A1 | 10/2003 | Fleming et al. |
| 2003/0195596 | A1 | 10/2003 | Augustine et al. |
| 2003/0208848 | A1 | 11/2003 | Flick et al. |
| 2004/0149711 | A1 | 8/2004 | Wyatt et al. |
| 2004/0164499 | A1 | 8/2004 | Murakami et al. |
| 2004/0174056 | A1 | 9/2004 | Gryp et al. |
| 2004/0193237 | A1 | 9/2004 | Krueger |
| 2004/0237206 | A1 | 12/2004 | Webster et al. |
| 2005/0016982 | A1 | 1/2005 | Campf et al. |
| 2005/0016993 | A1 | 1/2005 | Koskey |
| 2005/0051537 | A1 | 3/2005 | Lewis |
| 2005/0061122 | A1 | 3/2005 | Behringer |
| 2005/0061681 | A1 | 3/2005 | Lim et al. |
| 2005/0103353 | A1 | 5/2005 | Grahn et al. |
| 2005/0150763 | A1 | 7/2005 | Butters et al. |
| 2006/0085919 | A1 | 4/2006 | Kramer et al. |
| 2006/0120054 | A1 | 6/2006 | Buschke |
| 2006/0142828 | A1 | 6/2006 | Schorr et al. |
| 2006/0191675 | A1 | 8/2006 | Fletcher et al. |
| 2006/0210766 | A1 | 9/2006 | Press et al. |
| 2006/0247745 | A1 | 11/2006 | Thompson |
| 2006/0260060 | A1 | 11/2006 | Apperson et al. |
| 2006/0261055 | A1 | 11/2006 | Child et al. |
| 2007/0012675 | A1 | 1/2007 | Devroy |
| 2007/0023053 | A1 | 2/2007 | Bowen et al. |
| 2007/0049997 | A1 | 3/2007 | Fields et al. |
| 2007/0056096 | A1 | 3/2007 | Assink |
| 2007/0068916 | A1 | 3/2007 | Augustine et al. |
| 2007/0068928 | A1 | 3/2007 | Augustine et al. |
| 2007/0068929 | A1 | 3/2007 | Augustine et al. |
| 2007/0068930 | A1 | 3/2007 | Augustine et al. |
| 2007/0068931 | A1 | 3/2007 | Augustine et al. |
| 2007/0068932 | A1 | 3/2007 | Hewes et al. |
| 2007/0080155 | A1 | 4/2007 | Augustine et al. |
| 2007/0093883 | A1 | 4/2007 | Anderson et al. |
| 2007/0101996 | A1 | 5/2007 | Carstens |
| 2007/0106353 | A1 | 5/2007 | Carstens |
| 2007/0106355 | A1 | 5/2007 | Carstens |
| 2007/0108190 | A1 | 5/2007 | Ferguson |
| 2007/0142891 | A1 | 6/2007 | Stanley |
| 2007/0152479 | A1 | 7/2007 | Howman et al. |
| 2007/0164010 | A1 | 7/2007 | Rock et al. |
| 2007/0243452 | A1 | 10/2007 | Weidman et al. |
| 2007/0272673 | A1 | 11/2007 | Keane |
| 2007/0284356 | A1 | 12/2007 | Findlay |
| 2008/0021530 | A1 | 1/2008 | Castellani et al. |
| 2008/0083721 | A1 | 4/2008 | Kaiserman et al. |
| 2008/0127414 | A1 | 6/2008 | Allen |
| 2008/0173629 | A1 | 7/2008 | Deibel et al. |
| 2008/0203080 | A1 | 8/2008 | Fung |
| 2008/0217587 | A1 | 9/2008 | Gaudiana et al. |
| 2008/0249521 | A1 | 10/2008 | Dunning et al. |
| 2008/0249524 | A1 | 10/2008 | Dunning |
| 2008/0255641 | A1 | 10/2008 | Ellis |
| 2008/0281310 | A1 | 11/2008 | Dunning et al. |
| 2008/0281311 | A1 | 11/2008 | Dunning et al. |
| 2008/0283513 | A1 | 11/2008 | Ferguson, III et al. |
| 2009/0036884 | A1 | 2/2009 | Gregg et al. |
| 2009/0078690 | A1 | 3/2009 | Lee et al. |
| 2009/0095735 | A1 | 4/2009 | Resheff |
| 2009/0099630 | A1 | 4/2009 | Augustine et al. |
| 2009/0099631 | A1 | 4/2009 | Augustine et al. |
| 2009/0163984 | A1 | 6/2009 | Robinson et al. |
| 2009/0198230 | A1 | 8/2009 | Behnke et al. |
| 2009/0222996 | A1 | 9/2009 | Balonick et al. |
| 2010/0078807 | A1 | 4/2010 | Schulz |

(56) References Cited

U.S. PATENT DOCUMENTS

| | | | |
|---|---|---|---|
| 2010/0089896 | A1 | 4/2010 | Bart |
| 2010/0119704 | A1 | 5/2010 | Hemmelgarn et al. |
| 2010/0161016 | A1 | 6/2010 | Augustine et al. |
| 2010/0168825 | A1 | 7/2010 | Barbknecht |
| 2010/0183814 | A1 | 7/2010 | Rios et al. |
| 2010/0200558 | A1 | 8/2010 | Liu et al. |
| 2010/0204763 | A1 | 8/2010 | Augustine et al. |
| 2010/0213189 | A1 | 8/2010 | Keite-Telgenbuescher et al. |
| 2010/0222457 | A1 | 9/2010 | Wallner |
| 2010/0224612 | A1 | 9/2010 | Asami et al. |
| 2010/0275377 | A1 | 11/2010 | West |
| 2010/0279086 | A1 | 11/2010 | Park et al. |
| 2010/0283295 | A1 | 11/2010 | Smith et al. |
| 2010/0325796 | A1 | 12/2010 | Lachenbruch et al. |
| 2011/0031230 | A1 | 2/2011 | Kim |
| 2011/0047706 | A1 | 3/2011 | Hiebert |
| 2011/0092930 | A1 | 4/2011 | Poorman |
| 2011/0099900 | A1 | 5/2011 | Weder |
| 2011/0226751 | A1 | 9/2011 | Lazanja et al. |
| 2011/0233185 | A1 | 9/2011 | Augustine et al. |
| 2012/0065716 | A1 | 3/2012 | Gill et al. |
| 2012/0111846 | A1 | 5/2012 | Hammerschmidt |
| 2012/0140375 | A1 | 6/2012 | Kim et al. |
| 2012/0222192 | A1 | 9/2012 | Carey et al. |
| 2012/0238842 | A1 | 9/2012 | Colvin, Jr. et al. |
| 2012/0238901 | A1 | 9/2012 | Augustine |
| 2012/0255124 | A1 | 10/2012 | West |
| 2012/0273475 | A1 | 11/2012 | An |
| 2012/0279953 | A1 | 11/2012 | Augustine et al. |
| 2013/0036551 | A1 | 2/2013 | Mcgann |
| 2014/0074086 | A1 | 3/2014 | Macintyre-Ellis et al. |
| 2014/0263265 | A1 | 9/2014 | Augustine et al. |
| 2014/0312027 | A1 | 10/2014 | Augustine et al. |
| 2014/0316494 | A1 | 10/2014 | Augustine et al. |
| 2014/0316495 | A1 | 10/2014 | Augustine et al. |
| 2015/0047120 | A1 | 2/2015 | Partridge et al. |
| 2015/0143628 | A1 | 5/2015 | Fowler et al. |
| 2015/0148874 | A1 | 5/2015 | Augustine et al. |
| 2015/0216610 | A1 | 8/2015 | Augustine |
| 2015/0257953 | A1 | 9/2015 | Trabucco |
| 2015/0289817 | A1 | 10/2015 | Augustine et al. |
| 2015/0290027 | A1 | 10/2015 | Augustine et al. |
| 2015/0290062 | A1 | 10/2015 | Augustine et al. |
| 2015/0290065 | A1 | 10/2015 | Augustine et al. |
| 2015/0297435 | A1 | 10/2015 | Visco |
| 2015/0327332 | A1 | 11/2015 | Augustine et al. |
| 2015/0366367 | A1 | 12/2015 | Augustine et al. |
| 2015/0373781 | A1 | 12/2015 | Augustine et al. |
| 2016/0143091 | A1 | 5/2016 | Augustine et al. |
| 2016/0279007 | A1 | 9/2016 | Flatt |
| 2018/0140493 | A1 | 5/2018 | Shandas et al. |
| 2019/0091085 | A1 | 3/2019 | Emerson et al. |
| 2019/0091086 | A1 | 3/2019 | Emerson et al. |
| 2019/0099288 | A1 | 4/2019 | Vergara et al. |
| 2019/0262169 | A1 | 8/2019 | Vergara et al. |

FOREIGN PATENT DOCUMENTS

| | | | |
|---|---|---|---|
| DE | 10065592 | A1 | 7/2002 |
| DE | 102004011128 | A1 | 9/2005 |
| EP | 787476 | A2 | 8/1997 |
| EP | 1374822 | A1 | 1/2004 |
| EP | 2662063 | A1 | 11/2013 |
| EP | 3207912 | A2 | 8/2017 |
| GB | 586745 | A | 3/1947 |
| GB | 969253 | A | 9/1964 |
| JP | 2001248060 | A | 9/2001 |
| JP | 2018157923 | A | 10/2018 |
| WO | 9923992 | A1 | 5/1999 |
| WO | 9925155 | A1 | 5/1999 |
| WO | 0135878 | A2 | 5/2001 |
| WO | 0195841 | A2 | 12/2001 |
| WO | 0232661 | A2 | 4/2002 |
| WO | 2004093758 | A1 | 11/2004 |
| WO | 2007041389 | A1 | 4/2007 |
| WO | 2008089412 | A1 | 7/2008 |
| WO | 2010107724 | A1 | 9/2010 |
| WO | 2012125916 | A2 | 9/2012 |
| WO | 2013134477 | A1 | 9/2013 |
| WO | 2015157674 | A2 | 10/2015 |
| WO | 2015157684 | A1 | 10/2015 |
| WO | 2017184949 | A1 | 10/2017 |

OTHER PUBLICATIONS

Stoll & Greene, “Relationship Between Pain and Tissue Damage Due to Thermal Radiation,” J. Applied Physiology, vol. 14, No. 3, 1959, pp. 373-383.

Lenhardt et al., “Local warming and insertion of peripheral venous cannulas: single blinded prospective randomised controlled trial and single blinded randomised crossover trial,” British Medical Journal 325:409, Aug. 2002, 4 pages.

Bair Hugger brochure, retrieved from http://www.bairhugger.com/arizanthealthcare/pdf/600755A.pdf, 2003, 6 pages.

Eeon TexTM Conductive Textiles, Product Details, www.eeonyx.com/prodte.html, Sep. 19, 2006, pp. 1-5.

International Search Report for PCT/US2023/025534, Oct. 5, 2023, 11 pages.

Hdpatientwarming “WaffleGrip(TM) Trendelenburg Positioning System” , Jul. 9, 2018, pp. 1-6, Retrieved from the Internet: URL:https://www.youtube.com/watch?v=tP0X2T711Hk&feature=youtu.be [retrieved on May 28, 2020].

U.S. Appl. No. 90/014,744, Decision Granting Ex Parte Reexamination dated Jun. 9, 2021, 14 pages.

PATIENT SECUREMENT SYSTEM FOR THE SURGICAL TRENDELENBURG POSITION

RELATED APPLICATION

This application is a continuation of U.S. application Ser. No. 17/896,456, filed Aug. 26, 2022, which claims priority to U.S. provisional patent application No. 63/354,778, filed on Jun. 23, 2022, the entire contents of each of which are incorporated herein by reference.

TECHNICAL FIELD

This disclose relates generally to patient securement devices to stabilize the patient on the surgical table for the Trendelenburg and other positions.

BACKGROUND

Keeping the patient from sliding off of a surgical table when the table is tilted into a steep, head-down (Trendelenburg) position, is a constant challenge for surgical personnel and a danger for the patient. This problem has gotten worse in recent years with the advent of laparoscopic surgery and particularly with the advent of robotic surgery. In both of these instances, the patients are regularly placed into the steep Trendelenburg position so that gravity can move the internal organs out of the way of the laparoscopes. Depending on the angle or steepness of the head-down Trendelenburg positioning, the patient's weight, and the make-up of the support surface (e.g., bed sheets), patients can be at risk of sliding off of the head end of the surgical table in the Trendelenburg position. This is especially true for pelvic surgery (e.g. rectal, gynecological, and urological), where the head of the surgical table may be tilted as much as 45° downward in order to use gravity to move the bowels and other internal organs away from the pelvis to improve the view of the surgical site.

Types of patient securement devices have been tried over the years. In general, there are several categories of securement devices, including: straps and tape; shoulder bolsters; foam surgical table overlays; bean bags that mold around the patient; and gel pads that stick to the patient. Straps and tape across the chest have proven to not be secure. Straps over the shoulders have resulted in stretch injuries to the nerves of the brachial plexus. Similarly, bolsters of foam or bean bags at the patient's shoulders that are secured to the side rails of the bed have also resulted in stretch injuries to the nerves of the brachial plexus and are not recommended by the Association for Operating Room Nurses. Gel pads are cold and messy because everything sticks to them.

Foam surgical table overlays have become the standard securement devices. The foam is generally sized to cover the section of the surgical table that supports the patient's torso and head. Irrespective of the foam's coefficient of friction against the patient's skin, the smooth surface of the surgical mattress usually creates a lower coefficient of friction between the foam and the mattress than the coefficient of friction between the foam and the patient. Therefore, unwanted slipping is most likely to occur between the mattress and the foam surgical table overlay. In order to improve the connection between the mattress and the foam surgical table overlay, the foam overlay is typically taped or strapped to the side rails of the surgical table. However, tape sticking to a foam surgical table overlay or straps glued to a foam surgical table overlay as described by Pigazzi in U.S. Pat. No. 8,464,720, for example, have a significant risk of becoming unattached when the weight of a 400 pound patient is applied at a 45° head-down angle. Either the adhesive fails or the top layer of foam pulls away from the foam surgical table overlay while still being adhered to the tape.

Some known devices, as described in U.S. Pat. No. 10,045,902 for example, advocate for the use of thicker foam pads, such as viscoelastic pads having a thickness in the range of from three-fourths of an inch to three inches or greater to permit formation of a depression having a depth sufficient to assist in holding a patient on the pad. In the present disclosure, we refer to the formation of a depression having a depth sufficient to assist in holding a patient on the pad as a "bolster effect." The disadvantage of any securement device relying wholly or in part on a bolster effect is that bolster-type securement can be overpowered by excessive weight and rounded shaped shoulders that are common with obesity. Therefore, securement devices that rely in part on a bolster effect must provide instructions for use that limit both the weight of the patient and the angle of decline.

SUMMARY

It would be desirable to provide reliable, safe, and convenient patient securement devices to stabilize the patient on the surgical table for the Trendelenburg and other unusual positions.

The underbody support mattresses and blankets of this disclosure are intended for use in medical settings generally. These include the operating room, the emergency room, the intensive care unit, hospital rooms, nursing homes, and other medical treatment locations.

Various embodiments include flexible and conformable heated underbody supports including mattresses, mattress overlays, and pads for providing therapeutic warming to a person, such as to a patient in an operating room setting. In various embodiments, the heated underbody support is maximally flexible and conformable allowing the heated surface to deform and accommodate the person without reducing the accommodation ability of any underlying mattress, for example.

In some embodiments, a sheet of fabric or other material that has been at least partially coated on both sides with friction-enhancing elements, such as high-friction plastic or rubber, may be interposed between the patient and the underbody support in order to increase the coefficient of friction therebetween. An example of such friction-enhancing elements may be a PVC foam or silicone rubber applied as a pattern of three-dimensional raised dots onto a sheet of fabric. Another example of such friction-enhancing elements may be a foam layer attached to a. fabric layer.

In some embodiments, a sheet of fabric that is at least partially coated or laminated with friction enhancing elements is secured to the side rails of the surgical table by fabric or film or fabric reinforced film side securement flaps. The side securement flaps may be secured to the side rails by buttons attached to a side rail adaptor, or by hooks, or by straps. Irrespective of the attachment mechanism, the side securement flap material is contiguous between at least two adjacent attachment points to minimize the downhill shift that naturally occurs during Trendelenburg positioning or the distraction (pulling) of the leg during postless orthopedic hip surgery.

DETAILED DESCRIPTION OF PREFERRED EMBODIMENTS

The following detailed description is exemplary in nature and is not intended to limit the scope, applicability, or configuration of the invention in any way. Rather, the following description provides practical illustrations for implementing various exemplary embodiments. Examples of constructions, materials, dimensions, and manufacturing processes are provided for selected elements, and all other elements employ that which is known to those of skill in the field. Those skilled in the art will recognize that many of the examples provided have suitable alternatives that can be utilized.

Each of the following US patents is hereby incorporated by reference in its entirety: U.S. Pat. Nos. 10,765,580; 10,575,784; 10,959,675; 10,980,694; 10,993,866; 11,103,188; and 11,278,463.

Figure 1:
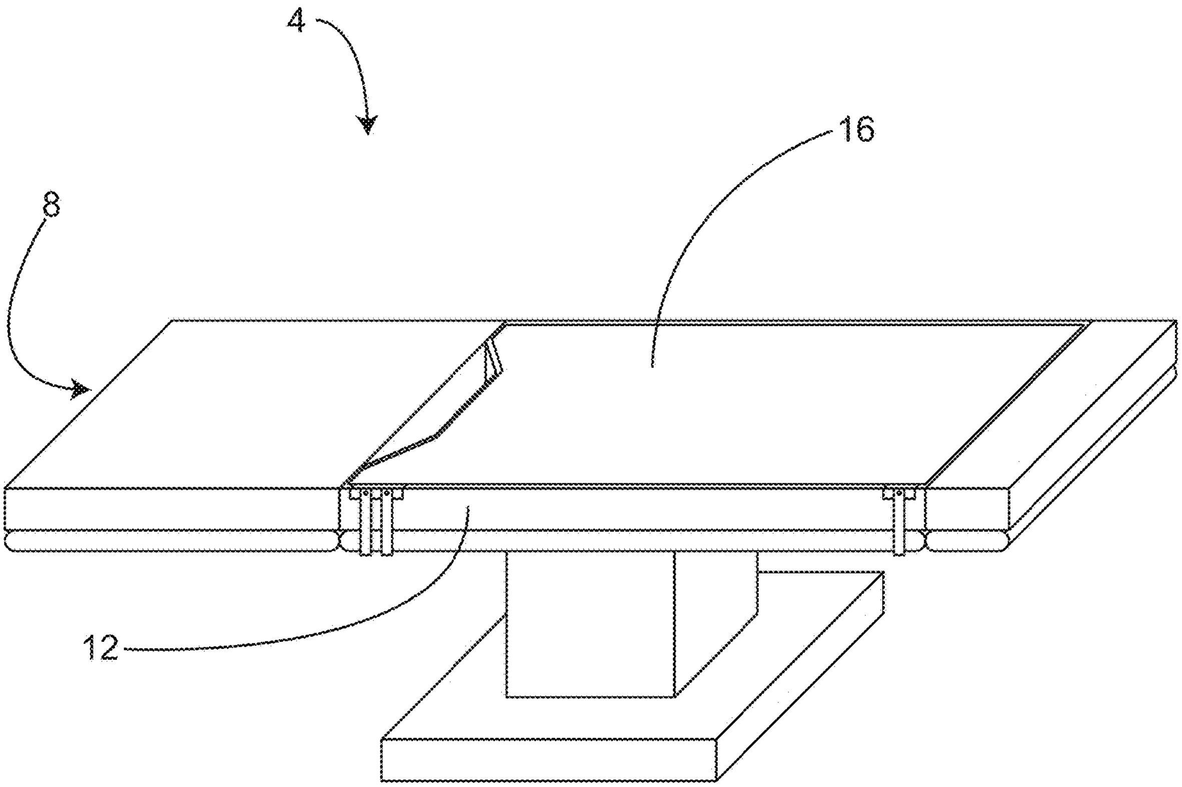
FIG. 1 is a perspective view of an underbody support attached to a surgical table in accordance with illustrative embodiments.

In some embodiments, as shown in FIG. 1, embodiments include underbody supports such as underbody supports, including mattresses, mattress overlays, and pads. The term underbody support may be considered to encompass any surface situated below and supporting a user in a generally recumbent position, such as a patient who may be undergoing surgery, including mattresses, mattress overlays and pads. In some examples the underbody supports may be heated.

Mattress overlay embodiments may be similar, or identical, to pad embodiments, with the only difference being whether or not they are used on top of a mattress. Furthermore, the difference between pad embodiments and mattress embodiments may be the amount of support and accommodation they provide, and some pads may be insufficiently supportive to be used alone like a mattress. As such, the various aspects which are described herein apply to mattresses, mattress overlay and pad embodiments, even if only one type of support is shown in the specific example.

While there is repeated reference to "heated underbody supports" in this disclosure, skilled artisans will appreciate that the heat feature is not a necessary component of every embodiment. Non-heated underbody support embodiments are also anticipated.

In some embodiments, the heated underbody support includes a heater assembly and a layer of compressible material. The heater assembly may include a heating element including a sheet of conductive fabric having a top surface, a bottom surface, a first edge, an opposing second edge, a length, and a width. The conductive fabric may include threads separately and individually coated with an electrically conductive or semi-conductive material, with the coated threads of the fabric being able to slide relative to each other such that the sheet is flexible and stretchable. In some embodiments, the conductive fabric may be made with threads that are conductive such as carbon fiber. In some embodiments, the sheet is made with conductive ink applied to a polymeric film such as polyester film and is therefore not made with conductive fabric. In some embodiments, the heater is made of conductive film such as carbon or graphite-loaded plastic film.

The heater assembly may also include a first bus bar extending along the entire first edge of the heating element and adapted to receive a supply of electrical power, a second bus bar extending along the entire second edge of the heating element, and a temperature sensor. The layer of compressible material may be adapted to conform to a person's body under pressure from a person resting upon the support and adapted to return to an original shape when pressure is removed. It may be located beneath the heater assembly and may have a top surface and an opposing bottom surface, a length, and a width, with the length and width of the layer being approximately the same as the length and width of the heater assembly.

In some embodiments, the bus bars may be braided wire. In some embodiments, it may be desirable to coat the bus bars with a flexible rubber material such as silicone rubber, during construction of the heater. While braided wire is relatively tolerant of repeated flexion, if the flexion occurs enough times at the same spot, even braided wire bus bars can fracture and fail. Coating the bus bars with silicone rubber can significantly increase the durability of the bus bars to survive repeated flexion.

In some embodiments, the conductive or semi-conductive material is polypyrrole. In some embodiments, the compressible material includes a foam material, and in some embodiments it includes one or more air filled chambers. In some embodiments, the heated underbody support also includes a water resistant shell encasing the heater assembly, including an upper shell and a lower shell that can be sealed together along their edges to form a bonded edge, with the heater assembly attached to the shell only along one or more edges of the heater assembly. In some embodiments, the heating element has a generally planar shape when not under pressure. The heating element is adapted to stretch into a three-dimensional compound curve without wrinkling or folding while maintaining electrical conductivity in response to pressure, and may return to the same generally planar shape when pressure is removed.

In some embodiments, the heated underbody support includes a heater assembly including a flexible heating element comprising a sheet of conductive fabric having a top surface, a bottom surface, a first edge and an opposing second edge, a length, and a width, a first bus bar extending along the first edge of the heating element and adapted to receive a supply of electrical power, a second bus bar extending along the second edge of the heating element, and a temperature sensor. The underbody support may further include a layer of compressible support material located beneath the heater assembly, which conforms to a patient's body under pressure and returns to an original shape when pressure is removed.

In some such embodiments, the heating element includes a fabric coated with a conductive or semi-conductive material, which may be a carbon or metal containing polymer or ink, or may be a polymer such as polypyrrole. In some embodiments, the heated underbody support also includes a shell including at least two sheets of flexible shell material surrounding the heater assembly, the shell being a water resistant plastic film or fiber reinforced plastic film with the at least two sheets sealed together near the edges of the heater assembly. In some embodiments, the heated underbody support also includes a power supply and controller for regulating the supply of power to the first bus bar.

In some such embodiments, the compressible material is a foam material. The heater assembly may be attached to the top surface of the layer of compressible material. In some embodiments, the heated underbody support includes a water resistant shell encasing the heater assembly and having an upper shell and a lower shell that are sealed together along their edges to form a bonded edge. In some such embodiments, one or more edges of the heater assembly may be sealed into the bonded edge. In some embodiments, the heater assembly is attached to the shell only along one or more edges of the heater assembly. In some embodiments, the heater assembly is attached to the compressible foam material layer. In some embodiments, the heated underbody support also includes an electrical inlet, wherein the inlet is bonded to the upper shell and the lower shell and passes between them at the bonded edge. In some embodiments, the heated underbody support also includes an electrical inlet, wherein the inlet is bonded to the side wall of the shell.

In some embodiments, the temperature sensor is adapted to monitor a temperature of the heating element and is located in contact with the heating element in a location upon which a patient would be placed during normal use of the support. In some embodiments, the heated underbody support also includes a power supply and a controller for regulating a supply of power to the first bus bar. Some embodiments of heating pads and mattresses have been disclosed in U.S. Pat. Nos. 8,604,391; 9,962,122; 10,201,935; and 10,206,248, the entire disclosures of which are incorporated by reference into the present disclosure.

Figure 2:
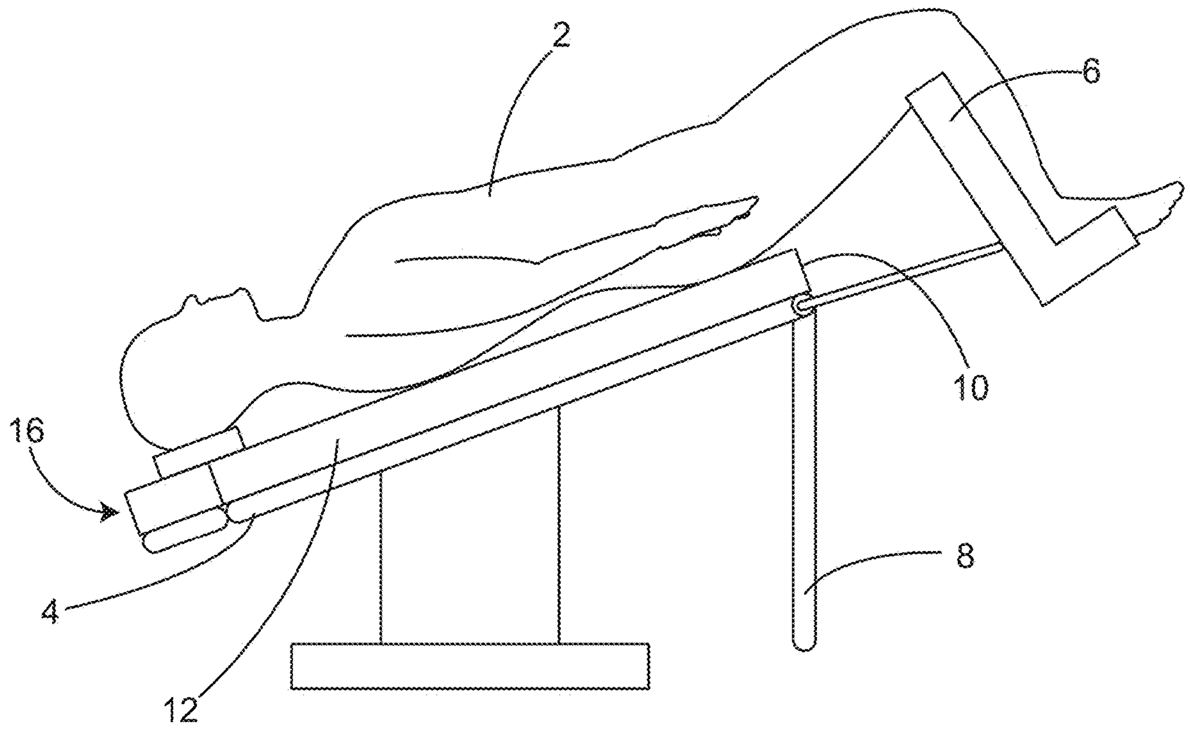
FIG. 2 is a side view of a patient lying on a surgical table in the Trendelenburg position in accordance with illustrative embodiments.
Figure 3:
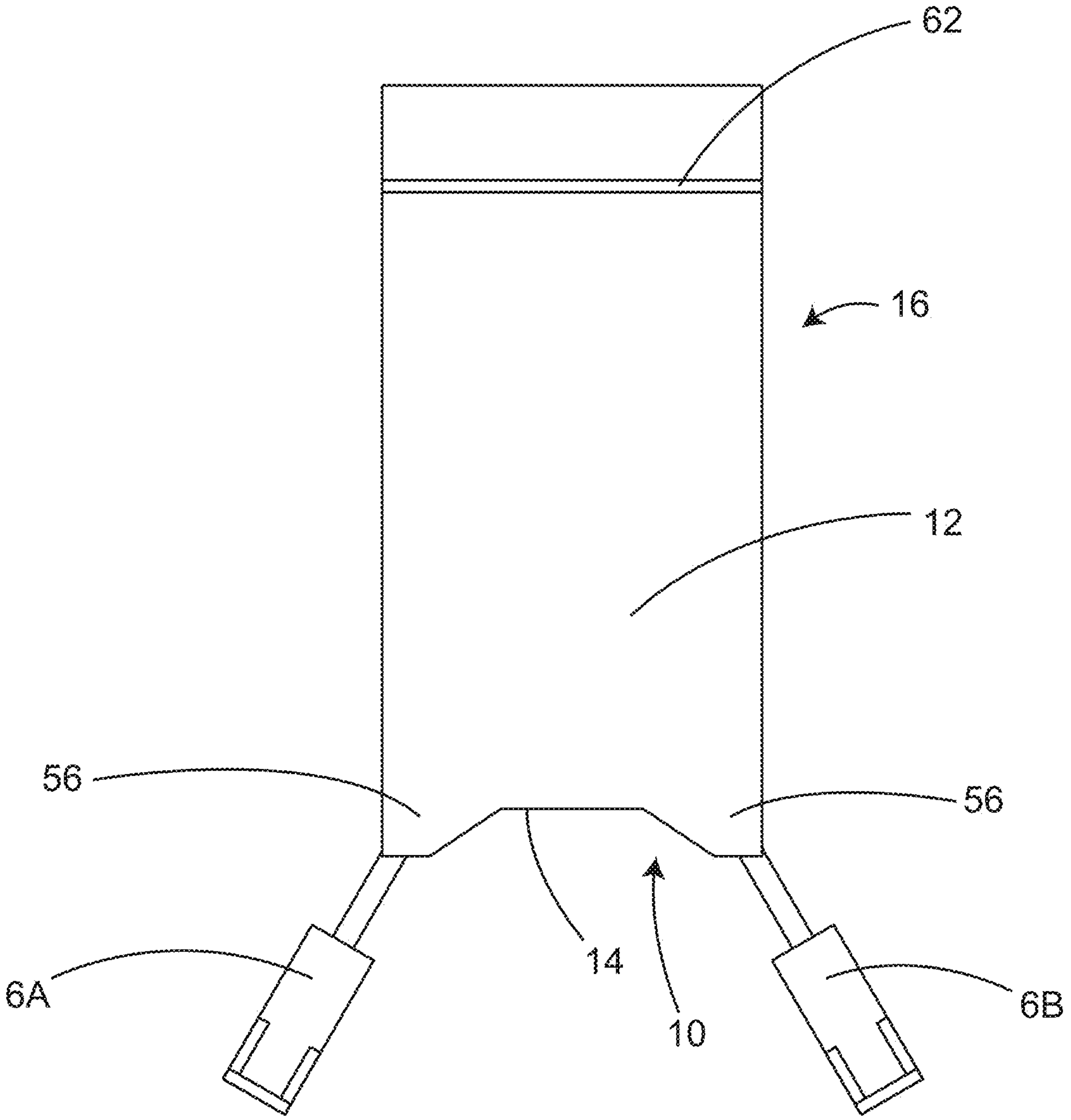
FIG. 3 is a top view of a surgical table with the foot section lowered and stirrups attached for the lithotomy position in accordance with illustrative embodiments.

The steep Trendelenburg position is often used during urological, gynecological and colorectal surgery, especially if the surgery is done with robotic or laparoscopic techniques. As shown in FIG. 2, the patient 2 is typically positioned supine on the surgical table 4 with their legs elevated in stirrups 6. In some cases, each stirrup 6 is shown individually in the drawings as reference numerals 6A and 6B. The surgical table 4 can optionally comprise metal. The foot end 8 of the surgical table 4 is lowered to allow the surgeon or robot access to the perineum of the patient. The steep Trendelenburg position allows gravity to pull the abdominal contents out of the pelvis for unobstructed access and visualization with the laparoscope. The patient's buttock is typically positioned at the foot end 10 of the underbody support or at the foot end 10 of the section 12 of the surgical table mattress 30 that supports the torso of the patient 2. The foot end 10 of the underbody support 16 or section 12 of the surgical table mattress 30 that is supporting the patient's torso typically has a notch cut out of the middle of the foot end, known as the perineal cutout 14, as shown in FIG. 3. The perineal cutout 14 allows the patient's perineum to hang slightly over the end of the center of the surgical table mattress 30 while still providing support on the lateral aspects of the buttock when the legs are elevated. The perineal cutout aids in unobstructed access to the patient's perineum by the surgeon or robot.

The underbody support 16 may include elements for anchoring the underbody support 16 to the surgical table 4. In some embodiments, the elements for anchoring may be a Velcro attachment between the upper surface of the surgical table 4 and the lower surface of the underbody support 16. The lower surface may also be called the table interface surface.

Figure 4:
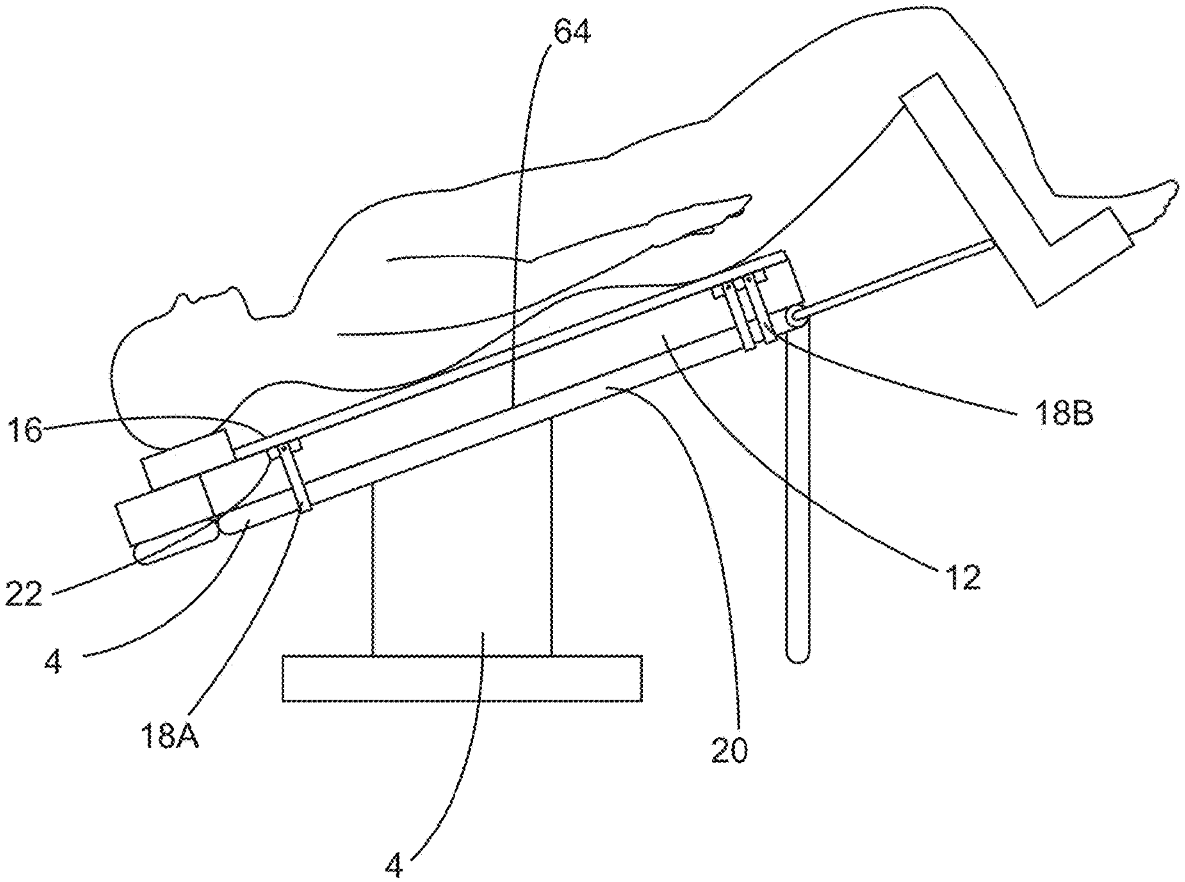
FIG. 4 is a side view of a patient laying on a surgical table and underbody support, in the lithotomy and Trendelenburg positions in accordance with illustrative embodiments.

In some embodiments, the elements for anchoring the underbody support 16 may be a strap attachment between the side of the surgical table 4 and the durable shell of the underbody support 16. As shown in FIG. 4, the straps 18 of the strap attachment may be made of non-stretching, reinforced strap material that can be looped around the side rails 20 of the surgical table 4 and then secured back onto itself. In some cases, the straps 18 are shown individually in the drawings as reference numerals 18A and 18B. The straps 18A, 18B may be secured with buttons, snaps, hooks, barbs, Velcro, or any other suitable secure attachment. In some embodiments, the straps 18A and 18B may be attached to the underbody support 16 at one or more strap attachment protrusions 22 of the upper and lower shell material layers, from the side of the underbody support 16. The one or more strap attachment protrusions 22 may be part of the perimeter weld between the upper and lower shell material layers of the underbody support 16, previously discussed. The one or more strap attachment protrusions 22 may be reinforced with a mesh of fibers such as nylon for added strength.

Figure 5:
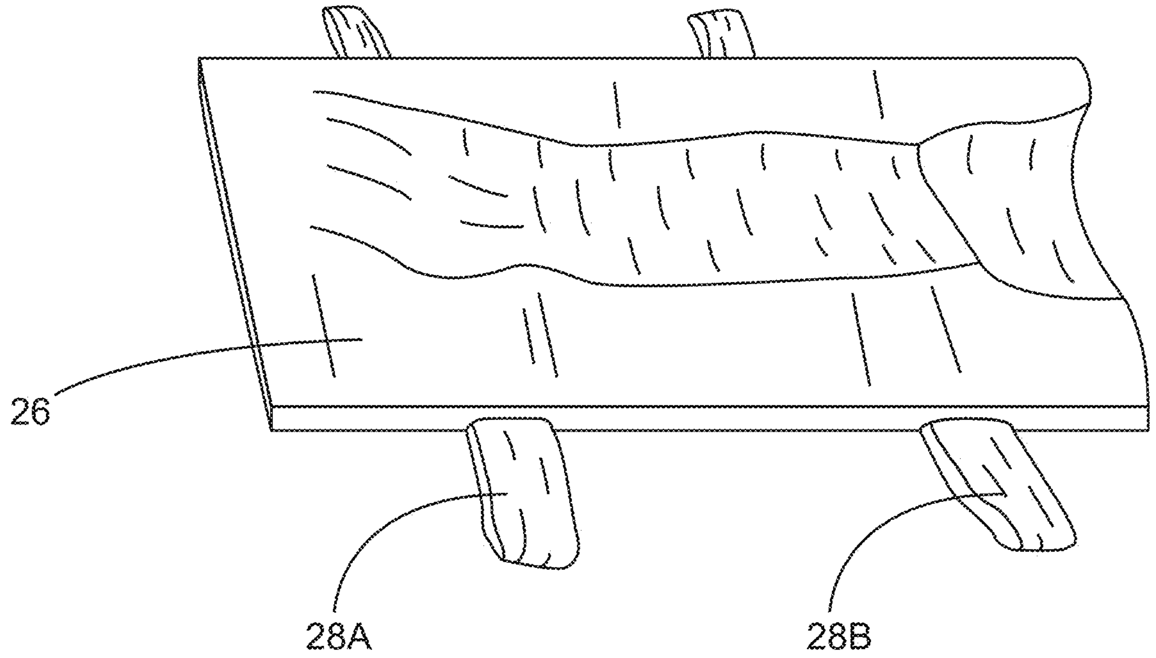
FIG. 5 is a perspective view of a securement pad in accordance with illustrative embodiments.
Figure 6:
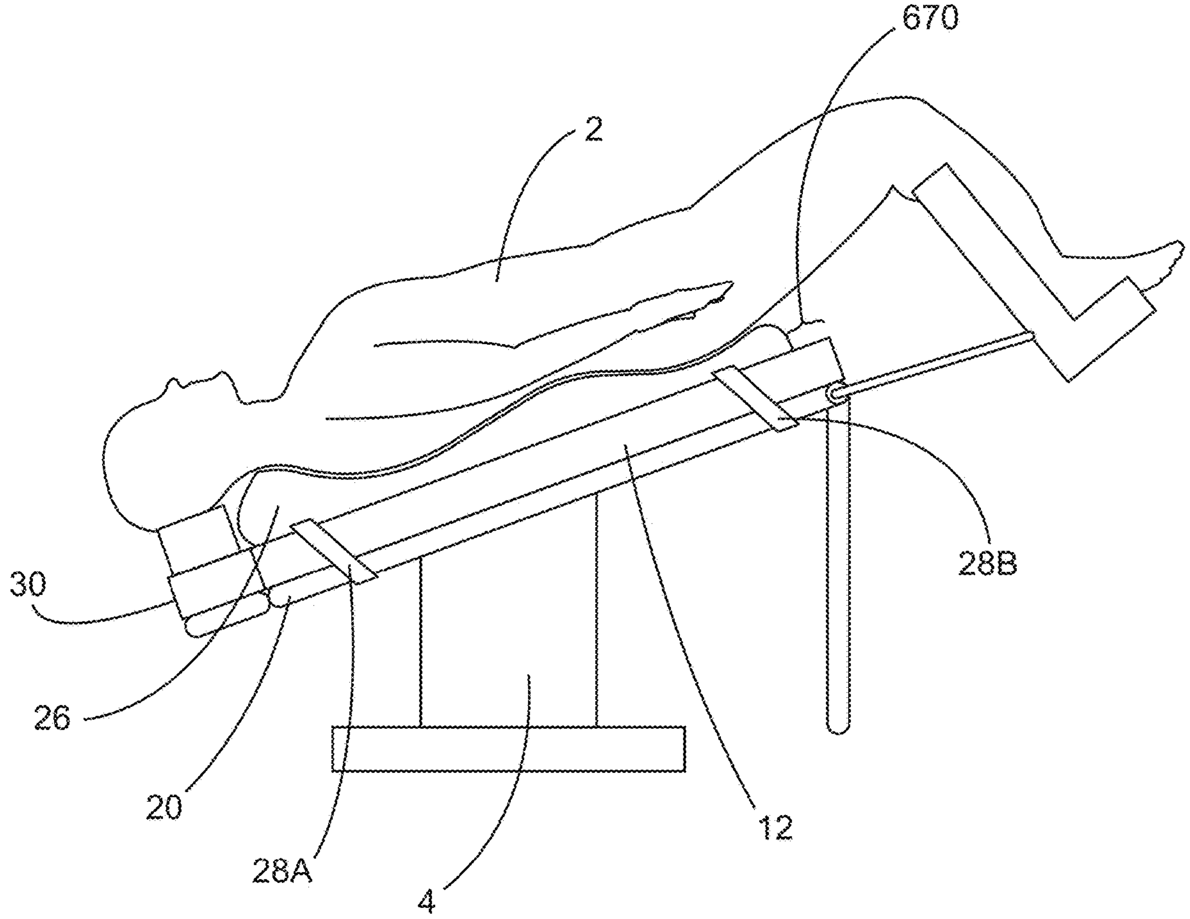
FIG. 6 is a side view of a patient laying on a surgical table and securement pad, in the lithotomy and Trendelenburg positions in accordance with illustrative embodiments.

In some embodiments, the shell material of the underbody support 16 may be reinforced with a mesh of fibers such as nylon embedded in the shell material during the shell material extrusion process. The fiber reinforcement may be included in the lower shell layer, the upper shell layer, or in both shell layers. The reinforcing fibers prevent the shell material from stretching and deforming when a heavy patient is placed in the steep Trendelenburg position, creating a sliding force between the layers of the underbody support or between the underbody support 16 and the surgical table mattress 30 or the surgical table top 64. This reinforced construction of the underbody support 16 in conjunction with the reinforced construction of the strap attachment protrusions 22 of the underbody support 16 together with the reinforced construction of the straps 18A, 18B connected to the side rails 20 of the surgical table 4, or Velcro attachment to the surgical table top 64, assures that the underbody support 16 will remain stable and not shift or slide when the patient is placed in the steep Trendelenburg position. In some embodiments, the durable construction of this underbody support 16 prevents deformation and stretching in any direction parallel to the plane of the support, thus preventing slippage between the underbody support 16 and the surgical table 4. The stability and inability to deform in response to the weight of the patient pulling the patient down the slope of the surgical table 4 provided by this construction, is in contrast to the relatively fragile and flexible construction of conventional disposable securement pads. As shown in FIGS. 5 and 6, conventional (e.g., flexible) securement pads 26 will easily deform in response to forces applied parallel to the plane of the securement pad 26, and this deformation results in slippage between the securement pad 26 and a section 12 of the surgical table mattress 30.

Additionally, as shown in FIG. 5, such type of securement pad 26 includes pad straps 28A, 28B that anchor the securement pad 26 to the side rails 20 of the surgical table 4. However, as shown in FIG. 6, anchoring these types of securement pads 26 to the side rails 20 allows a natural 1-3 inches of slippage between the securement pad 26 and the surgical table 4. This slippage in this type of securement pad 26 is due to the force of the patient's weight being applied perpendicularly to the direction of the pad straps 28A, 28B that are nondurable and stretchable and glued to the securement pad 26 that is typically made of a stretchable sheet of flexible viscoelastic foam. These pad straps 28A, 28B, which are perpendicularly oriented, nondurable, flexible, and stretchable, in conjunction with the conventional securement pad 26 (which is often a flexible and deformable foam) stretch and flex in combination, allowing the securement pad 26 to slide down the surgical table mattress 30 up to three inches in the steep Trendelenburg position, before arresting the slide. A sliding motion down the steep incline of the table cannot be prevented when perpendicular forces to the side rails 20 are applied to pad straps 28A, 28B that are glued to the securement pad 26 (when such pad is a flexible foam pad). The side rails 20 of the surgical table 4 are a convenient attachment point for known devices but cannot prevent 1-3 inches of sliding down the incline of a surgical table 4 in the Trendelenburg position using the pad straps 28A, 28B and securement pad 26 described above.

Figure 7:
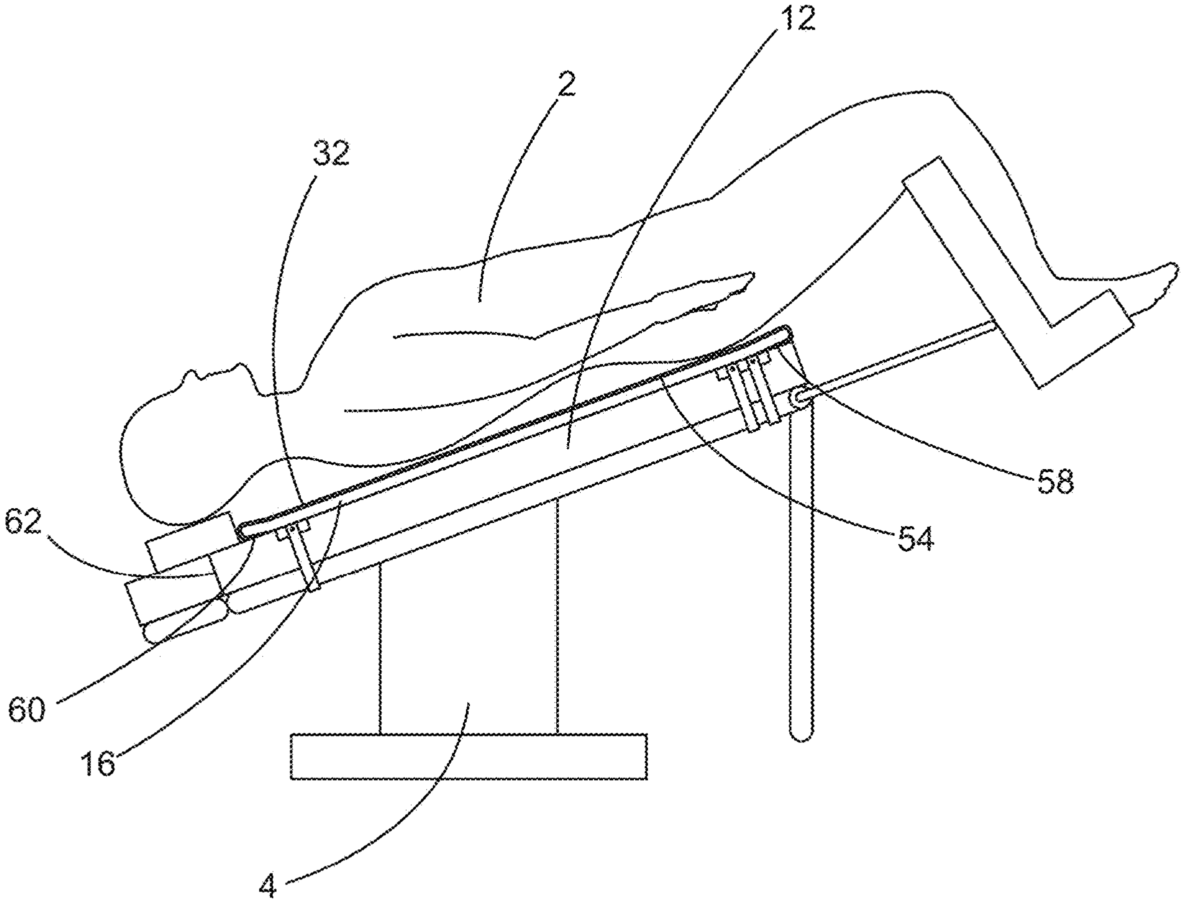
FIG. 7 is a side view of a patient laying on a surgical table, underbody support and sheet of fabric, in the lithotomy and Trendelenburg positions in accordance with illustrative embodiments.
Figure 7A:
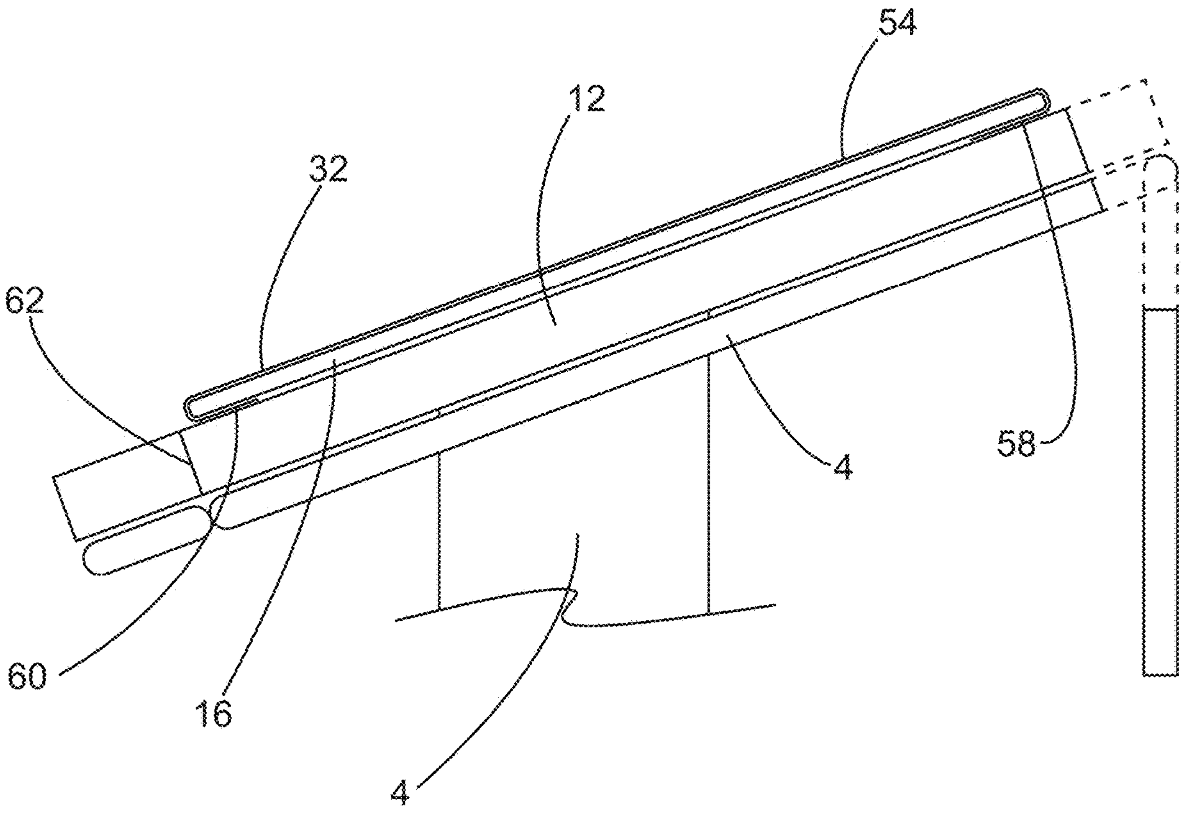
FIG. 7A is a side view of a surgical table with an underbody support and sheet of fabric in the Trendelenburg position, in accordance with illustrative embodiments.
Figure 8:
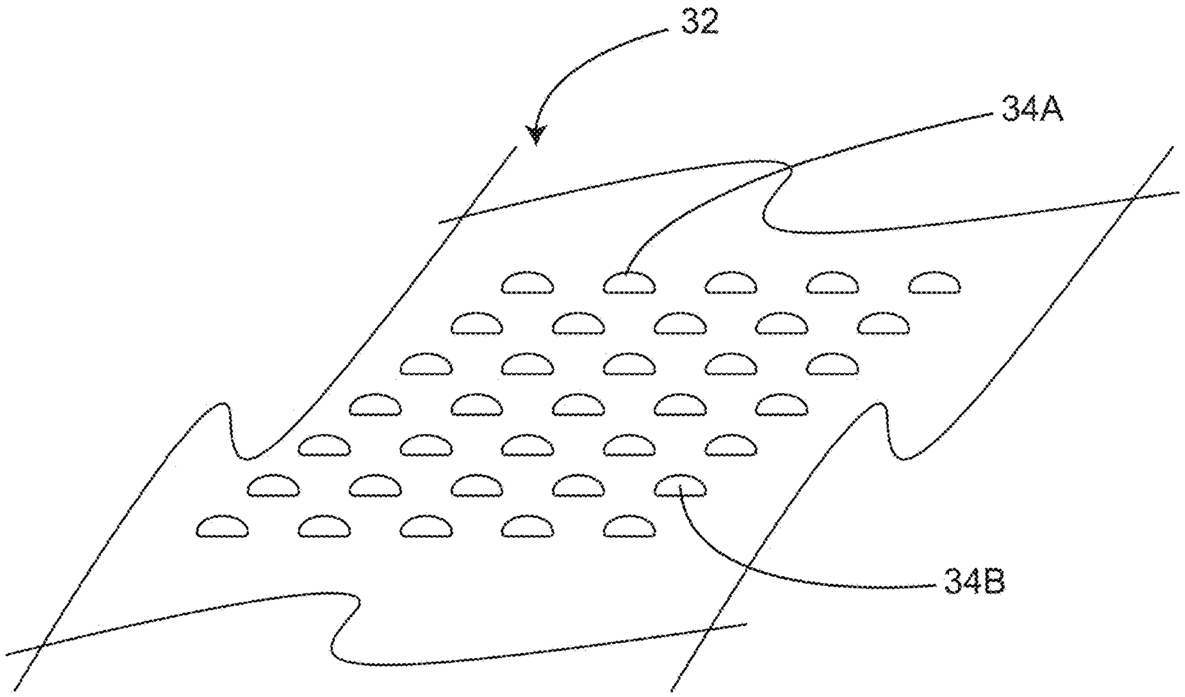
FIG. 8 is a detailed perspective view of a sheet of fabric, in accordance with illustrative embodiments.
Figure 9:
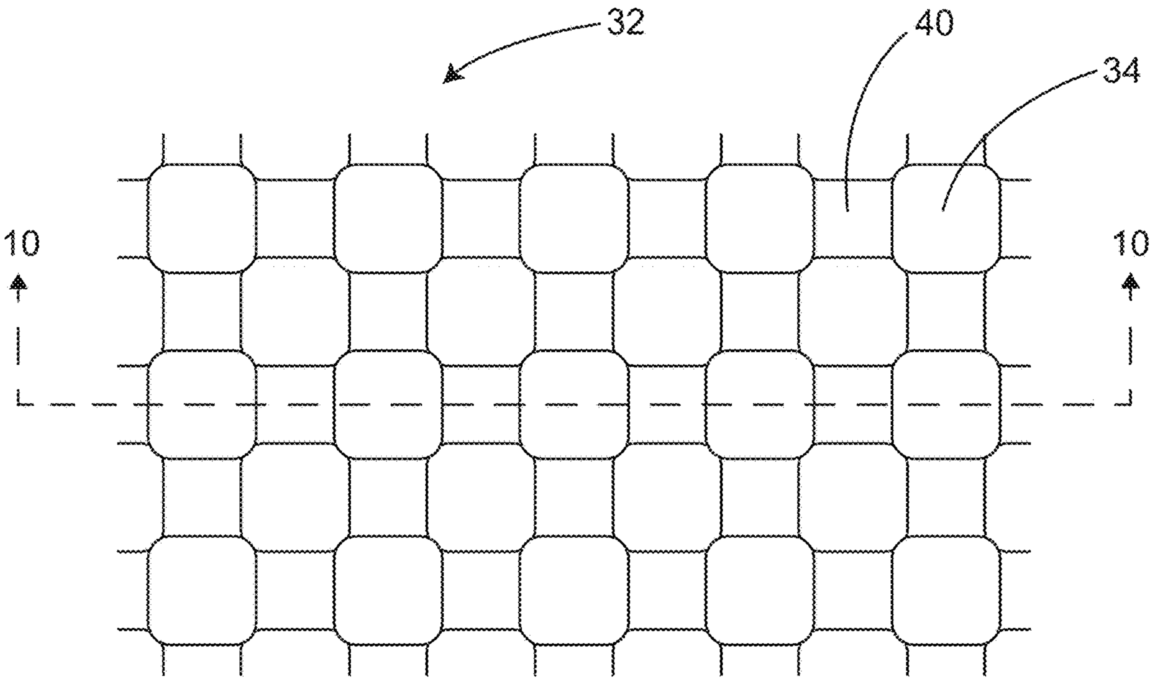
FIG. 9 is a detailed top view of a sheet of fabric, in accordance with illustrative embodiments.

In some embodiments, as shown in FIGS. 7 and 7A, a sheet of fabric 32 that has been at least partially coated on both sides with friction-enhancing elements 34 may be interposed between the patient 2 and the underbody support 16 in order to increase the coefficient of friction therebetween. The friction-enhancing elements 34 may be high-friction plastic or rubber, or a material having similar characteristics. An example of material for the friction-enhancing elements 34 may be PVC, silicone, polyethylene or other plastic or rubber materials that may be applied as a three-dimensional pattern or three-dimensional raised dots onto a fabric. As shown in FIGS. 8 and 9, the friction-enhancing elements 34 may be in the form of a pattern or dots, and grip the upper surface of the underbody support 16 on one side and the back of the patient 2 on their other side, dramatically increasing the coefficient of friction between the patient 2 and a surface of the underbody support 16, preventing the two from slipping against each other. Alternately, the friction-enhancing elements 34 may be applied directly to the upper surface of the underbody support 16. The upper surface may also be called a patient interface surface.

In some embodiments, a sheet of fabric 32 is interposed between the upper surface of the underbody support 16 and the back of the patient 2 in order to increase the coefficient of friction between these two surfaces. The sheet of fabric 32 may be either woven or non-woven and may be made of any durable fiber such as polyester, rayon, nylon or cotton. Other fibers for the sheet of fabric 32 are also anticipated. In some embodiments, if a fluid impervious layer is desirable, the sheet of fabric 32 in this disclosure may be made of plastic film or plastic film coated or laminated onto one or both sides of a sheet of fibrous fabric. The plastic film layer may be made of polyethylene, polypropylene, PVC, urethane or other suitable films.

In some embodiments, the sheet of fabric 32 is partially coated on at least its upper surface 36 with friction-enhancing elements 34. The friction-enhancing elements 34 can be a plastic or rubber three-dimensional friction-enhancing elements, such as a three-dimensional raised pattern of circular, square, rectangular or oblong elements. In some embodiments, the friction-enhancing elements 34 are between 0.1 inches and 0.5 inches in diameter or cross section. The friction-enhancing elements 34 include but are not limited to: PVC foams, viscoelastic PVC foams, silicone, viscoelastic polyurethane foams, other viscoelastic polymeric foams, urethane, PVC, as well as other polymers and rubbers.

Figure 10:
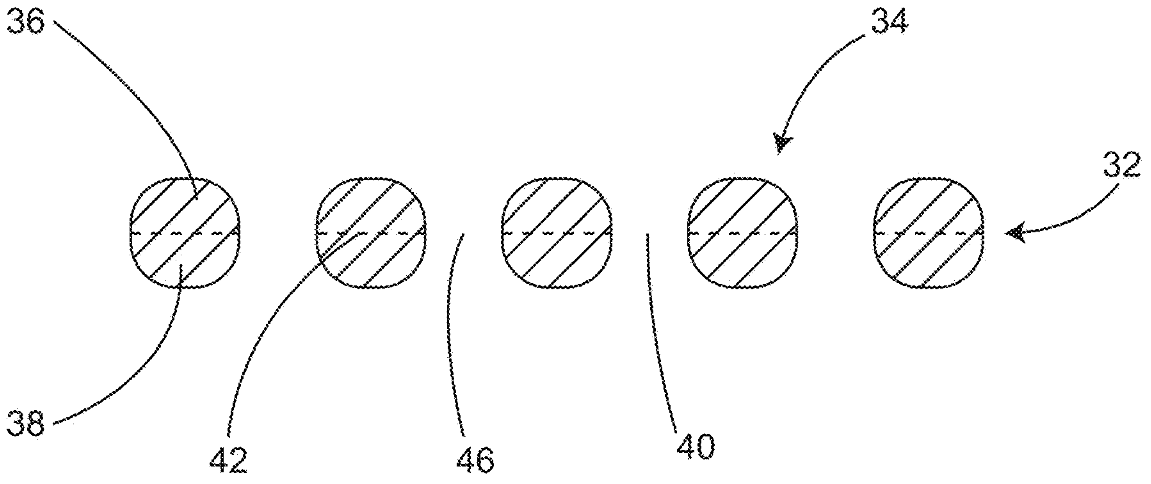
FIG. 10 is a detailed cross-sectional view of a sheet of fabric taken along line 10-10 of FIG. 9, in accordance with illustrative embodiments.
Figure 11:
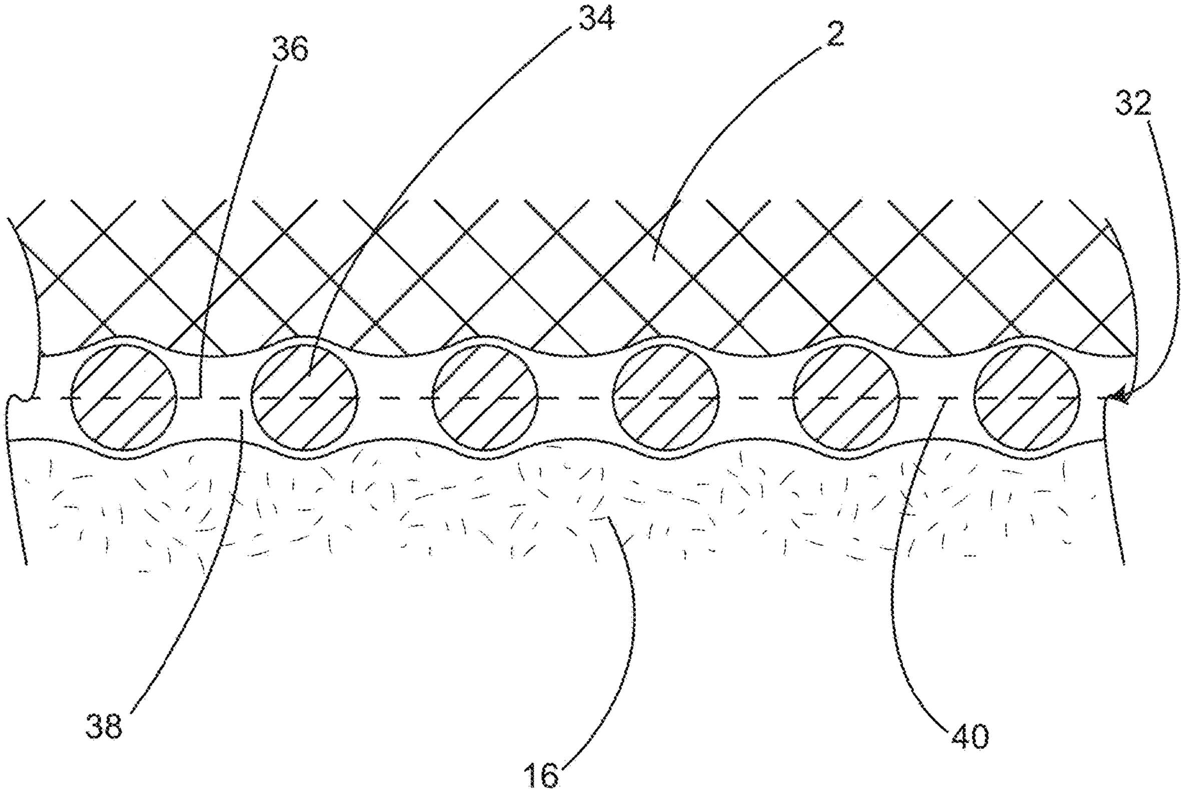
FIG. 11 is a detailed cross-sectional view of a sheet of fabric taken along line 10-10 of FIG. 9, positioned between the patient and the underbody support in accordance with illustrative embodiments.

In some embodiments, as shown in FIGS. 10 and 11, the sheet of fabric 32 is partially coated on both the upper surface 36 and the lower surface 38 with friction-enhancing elements 34. The friction-enhancing elements 34 can be plastic or rubber three-dimensional friction-enhancing elements, such as a three-dimensional raised pattern of circular, square, rectangular or oblong elements. In some embodiments, the friction-enhancing elements 34 on the upper surface 36 and lower surface 38 are three-dimensional friction-enhancing elements that directly oppose each other in size and location on each side of the sheet of fabric 32. As used herein, friction-enhancing elements 34 that directly oppose each other in both size and location refers to friction-enhancing elements 34 that are positioned directly opposite one another on opposite sides of the sheet of fabric 32 and that have the exact same dimensions (or substantially the same dimensions) as each other. Direct opposition of the friction-enhancing elements 34 on both sides of the sheet of fabric 32 improves the transmission of force between the upper surface of the underbody support 16 and the patient's back, at that point. The ability of the friction-enhancing elements 34 on each side of the sheet of fabric 32 to increase the coefficient of friction by indenting the patient's back 2 on one side and the underbody support 16 on the other side is reduced if the friction-enhancing elements 34 on each side of the sheet of fabric 32 are not directly opposing each other. In some embodiments, the friction-enhancing elements 34 are three-dimensional friction-enhancing elements intended to press into the patient's skin creating a small indentation that adds to the mechanical interaction between the sheet of fabric 32 and the patient's skin. This mechanical interaction between the sheet of fabric 32 and the patient's skin, indenting the skin, augments the normal coefficient of friction between the two surfaces. Locating the friction-enhancing elements 34 directly opposing each other on each side of the sheet of fabric 32, maximizes the ability of each friction-enhancing element 34 to transmit force from the underbody support 16 to the patient's back.

In some embodiments, as shown in FIGS. 9, 10 and 11, the friction-enhancing elements 34 on the upper surface 36 of the sheet of fabric 32, which can be a three-dimensional raised pattern of friction-enhancing elements, may form a matrix leaving the sheet of fabric 32 with holes 40 in the areas between the raised pattern of friction-enhancing elements. The holes 40 in the sheet of fabric 32 may advantageously allow the free passage of heat, air and moisture through the sheet of fabric 32. When the underbody support 16 is a heated underbody support, the holes 40 allow heat from the underbody support 16 to freely pass through the sheet of fabric 32 to the patient to provide effective warming. This is in contrast to the thermally insulating quality of conventional securement pads 26 (e.g., comprising foam) that prevent effective underbody patient warming. The holes 40 in the sheet of fabric 32 of the present disclosure may also advantageously allow the free passage of moisture through the sheet of fabric 32, removing the perspiration or skin prep antiseptic solutions that could be contacting the patient's skin and making the skin more susceptible to pressure injury.

Figure 12:
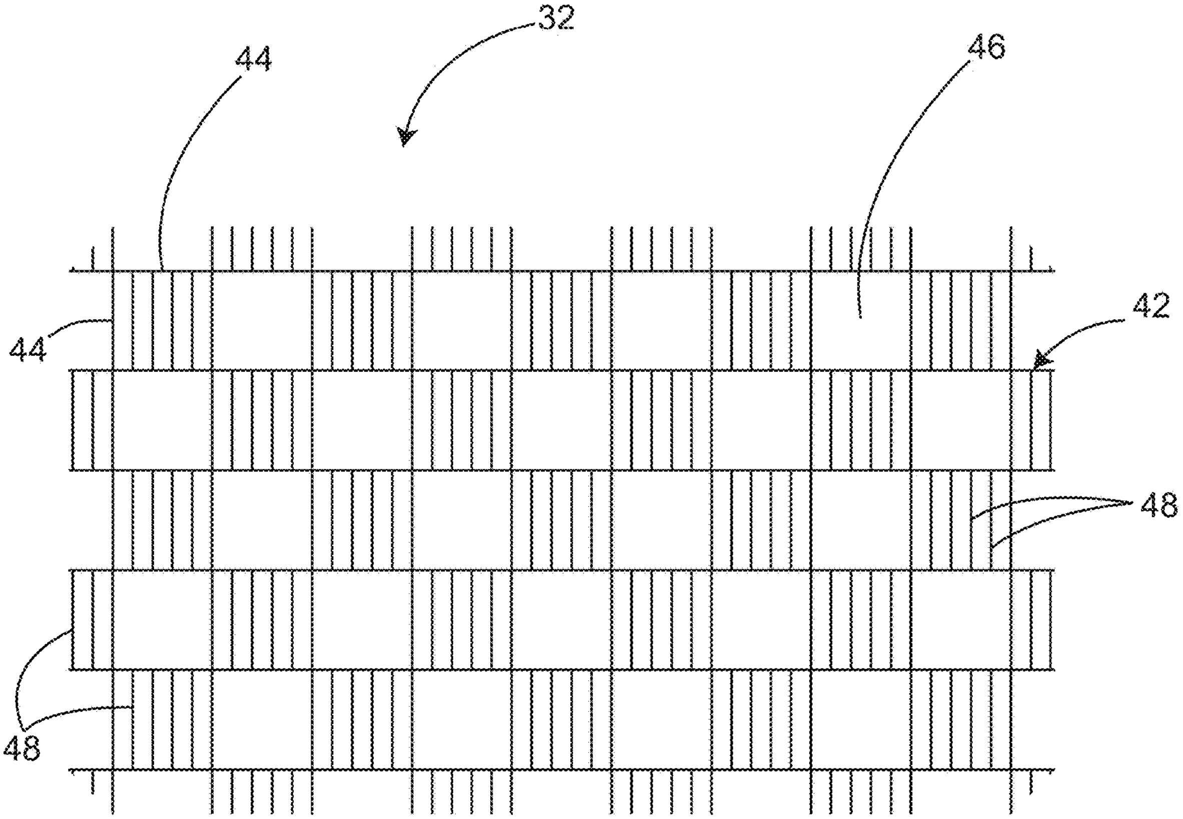
FIG. 12 is a detailed top view of the scrim, in accordance with illustrative embodiments.

In some embodiments, as shown in FIG. 12, the construction of a sheet of fabric 32 with friction-enhancing elements 34 that are three-dimensional and that directly oppose each other on both sides of the fabric and with holes or uncoated spaces 40 in between the friction-enhancing elements 34, may be made by starting with a scrim 42, which can be a fabric scrim made of polyester or other suitable fibers. The threads 44 of the scrim 42 may be woven or knitted into a pattern such as a checkerboard pattern for example, with open spaces 46 between the matrix of threads 44. The open spaces 46 between the threads may be between about 0.05 inches and about 0.25 inches in diameter. In open spaces 46, similar to the black spaces on a checkerboard, additional threads 48 may be added during the weaving or knitting process. As shown in FIG. 9, when a foamed PVC compound is coated onto this scrim 42 sheet of fabric 32, the liquid PVC sticks to the spaces where additional threads 48 were added and open holes or uncoated spaces 40 are formed in the open spaces 46 where additional threads were not added. The foamed PVC naturally and advantageously forms friction-enhancing elements 34 that can be three-dimensional friction-enhancing elements directly opposing each other on each side of the sheet of fabric 32 where the additional threads 48 were added and leaves holes or uncoated spaces 40 in between the friction-enhancing elements 34 (available from Kittrich Corp.).

In some embodiments, the area of one hole 40 may advantageously be less than the area of one of the friction-enhancing elements 34. In some embodiments, the area of one of the holes 40 may advantageously be less than 0.1875 square inches. Holes 40 that are larger than 0.1875 square inches disadvantage both the area of skin supporting the weight of the patient's body and the natural tackiness between the friction-enhancing elements 34 and the skin. Further, holes 40 that are larger than 0.1875 inches square may create a hydrostatic pressure gradient within the patient's skin protruding into the hole 40 resulting in a pattern of petechiae or bruising.

Figure 13:
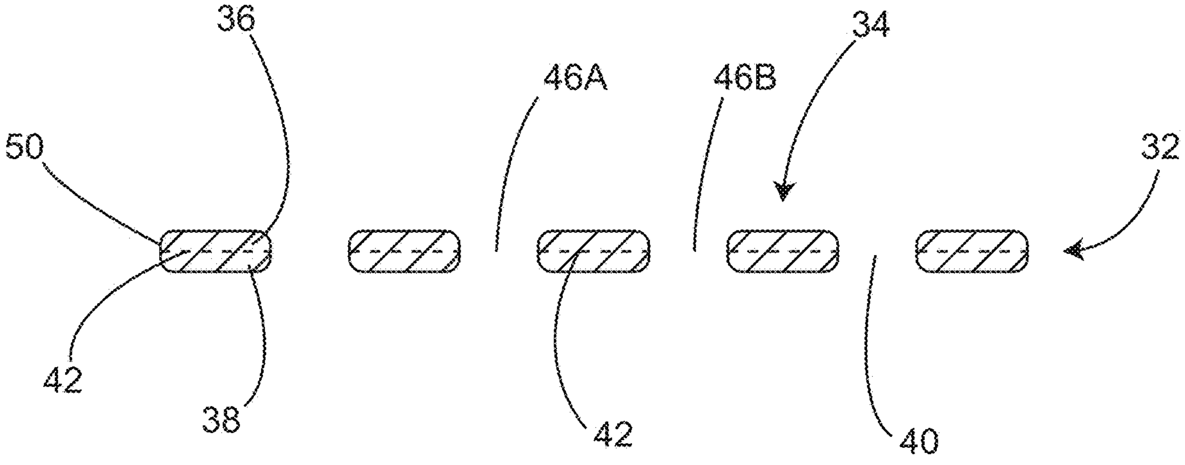
FIG. 13 is a detailed cross-sectional view of a sheet of fabric taken along line 10-10 of FIG. 9, in accordance with illustrative embodiments.

In some embodiments, as shown in FIG. 10, the friction-enhancing elements 34 formed on the (e.g., open weave) scrim 42 sheet of fabric 32 are approximately 0.125 inches in total thickness. Such friction-enhancing elements 34 can be foamed PVC three-dimensional friction-enhancing elements. Applicant has found that these 0.125 inch thick dots or beads in a matrix formation with spaces in between the dots may cause mild petechiae (bruising or extravasation, blood leaking into the unsupported skin tissue that is pressed into the open spaces of the checkerboard pattern). This problem with petechiae may be mitigated by flattening at least the friction-enhancing elements 34 on the upper surface 36 of the sheet of fabric 32 when those friction-enhancing elements 34 are rounded three-dimensional friction-enhancing elements. In some embodiments, as shown in FIG. 13, the sheet of fabric 32 with friction-enhancing elements 34 that are foamed PVC three-dimensional friction-enhancing elements and that have open spaces 46 therebetween can be flattened by running it through a heat laminating process that may flatten the three-dimensional dots from approximately 0.125 inches in thickness to approximately 0.05-0.10 inches in thickness. In some cases, each open space 46 is shown individually in the drawings as reference numerals 46A and 46B. Flattening the foamed PVC three-dimensional friction-enhancing elements does not close the checkerboard of holes 40 between the friction-enhancing elements 34 but it does make the holes 40 slightly smaller in surface area compared to the surface area of the adjacent friction-enhancing elements 34. In some embodiments, a heat laminator may heat the sheet of fabric 32 before running it through two compression rollers. Alternately, the sheet of fabric 32 may be run through two compression rollers of which one or both are heated. The flattened friction-enhancing elements 50 (which can be foamed PVC three-dimensional friction-enhancing elements) having holes 40 of smaller diameter therebetween, may not cause petechiae but also do not grip the patient as effectively.

Where the friction-enhancing elements 34 are foamed PVC three-dimensional friction-enhancing elements, flattening these friction-enhancing elements 34 in a heat laminator process also alters the surface characteristic of the foamed PVC material, making it substantially stickier. The heating and compression process disrupts the normal "skin" that forms on the surface of foam as it cures. Disrupting the surface "skin" exposes the "stickier" inner foam. The stickier PVC foam further increases the coefficient of friction between the underbody support 16 and the patient 2. The "stickier" PVC foam may stick to the patient better than the skinned foam but it does not stick as well to adhesives. The exposed plasticizer in the foam interferes with the adhesion of adhesives. Therefore, if pieces of the sheet of fabric 32 are intended to be adhesively bonded to the draw sheet 76 or other materials, it may be advantageous to adhesively bond to the non-compressed side of the sheet of fabric 32. The original "skin" characteristic of the foamed PVC material on the lower surface 38 helps with adhesive bonding. The stickier foam PVC in the presence of heat from the underbody support 16 and pressure from the weight of the patient 2, may leave an unsightly residue of foam adhered to the underbody support 16. In some embodiments, this adhesion residue may be prevented by heating and flattening the friction-enhancing elements 34 on the upper surface 36 of the sheet of fabric 32, while leaving the original "skin" characteristic of the foamed PVC material on the lower surface 38 substantially unchanged and less sticky. The original "skin" characteristic of the foamed PVC material on the lower surface 38 helps to prevent the residue of foam from adhering to the underbody support 16.

Figure 14:
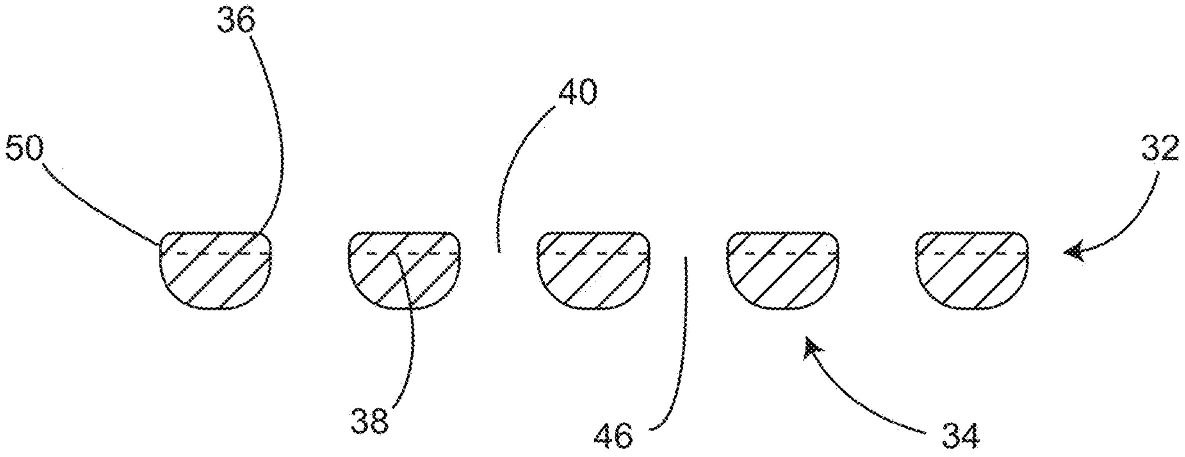
FIG. 14 is a detailed cross-sectional view of a sheet of fabric taken along line 10-10 of FIG. 9, in accordance with illustrative embodiments.

In some embodiments, as shown in FIG. 14, the flattening of the friction-enhancing elements 34 to form friction-enhancing elements 50 on the upper surface 36 of the sheet of fabric 32 can be accomplished by heating the upper surface and/or heating the upper compression roller or both. In some embodiments, the original structure, shape and surface integrity of the friction-enhancing elements 34 on the lower surface 38 of the sheet of fabric 32 may be preserved by heating the upper surface and minimally heating the lower surface and/or cooling the lower compression roller during the compression process.

In some embodiments, the sheet of fabric 32 with friction-enhancing elements 34 (which can be foamed PVC three-dimensional friction-enhancing elements) and having uncoated spaces or holes 40 therebetween, can be flattened and thinned by running it through a heated compression process. The heated compression process may advantageously produce a patient securement device with very little thickness (compared to conventional thick foam pad securement devices) yet retain most of the gripping characteristics.

In some embodiments, the underbody support 16 may also serve as a capacitive coupling electrosurgical grounding electrode. Effective capacitive coupling requires that the two electrical conductors be separated by only a thin dielectric (electrical insulator). Capacitive coupling of RF electrical energy is most efficient and effective when the patient's skin is separated from the grounding antenna by a thin dielectric or electrical insulating material. A thick dielectric, for example greater than 0.5 inches, will prevent effective capacitive coupling electrosurgical grounding. The friction-enhancing elements 34 (which can be three-dimensional friction-enhancing elements) on the sheet of fabric 32 of the present disclosure create a thin dielectric. The thickness of this dielectric may be further decreased by heating and compressing the friction-enhancing elements 34 between two rollers as described above in order to form flattened friction-enhancing elements 50, which further enhances the effectiveness of the capacitive coupling. In some embodiments, the thin nature of the sheet of fabric 32 of the instant invention (such as less than 0.125 inches thick), allows effective capacitive coupling electrosurgical grounding. The capacitive coupling may be even further enhanced by the holes or uncoated spaces 40 that are formed between the friction-enhancing elements 34, 50, where there is no added electrical insulating (dielectric) properties caused by the sheet of fabric 32. The invention of this disclosure is uniquely suited for use with capacitive coupling electrosurgical grounding. In contrast, the conventional (e.g., thick foam) securement pads 26 prevent effective capacitive coupling from occurring.

Figure 15:
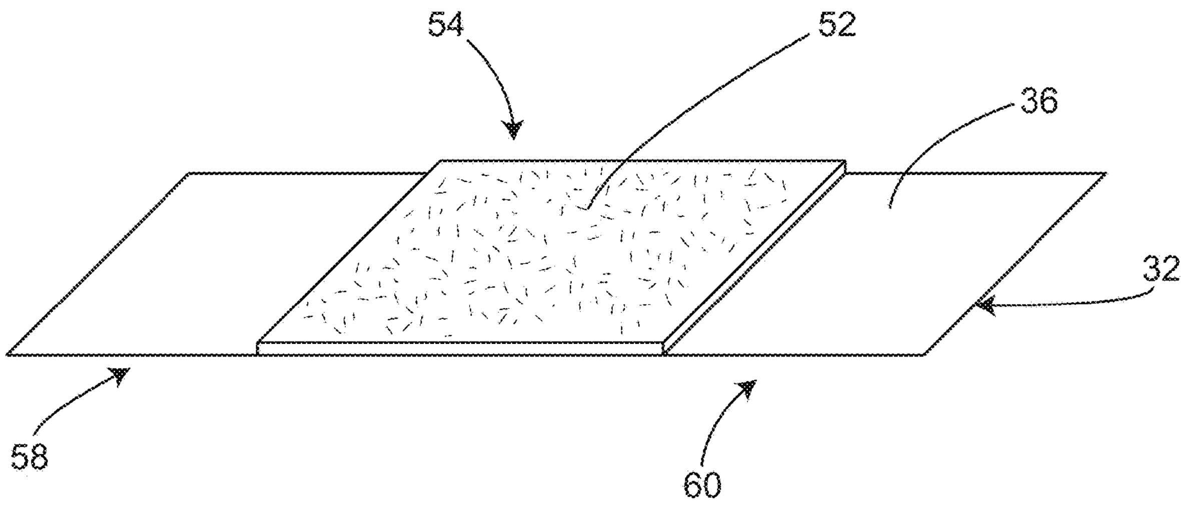
FIG. 15 is a perspective view of a sheet of fabric with a layer of foam material in accordance with illustrative embodiments.

In some embodiments, the total thickness of each of the (e.g., three-dimensional) friction-enhancing elements 34 on both the upper 36 and lower 38 surfaces of the sheet of fabric 32 is less than 0.25 inches. In some embodiments, as shown in FIG. 15, a layer of flexible foam material 52 is adhesively laminated to the upper surface 36 of the sheet of fabric 32. In some cases, the layer of flexible foam material 52 is less than 0.75 inches thick. Laminating a layer of flexible foam material 52 to the sheet of fabric 32, substantially increases the strength, stability and tear resistance of the layer of flexible foam material 52. The minimal thickness of the resulting patient securement overlay 54 compared to known securement pads, eliminates the bolster effect that would occur with a thicker non-weight bearing foam surrounding the patient especially at the shoulders. When the layer of flexible foam material 52 is relatively thin, the patient cannot appreciably sink into the foam so as to create a bolster effect. This is advantageous because effectiveness of patient securement by a bolster effect is limited by the patient's weight and the shape of their shoulders. For example, heavy patients and rounded shoulders can overcome the ability of a bolster to prevent sliding.

In some embodiments, minimizing or even eliminating any weight-limited patient securing bolster effect in the patient securement overlay 54 by limiting the thickness to less than 0.75 inches, results in a patient securing effectiveness that is determined nearly exclusively by the coefficient of friction between the patient and the patient securement overlay 54. Coefficient of friction is by definition, independent of the patient's weight. In some embodiments, due to the physical properties of the coefficient of friction, the effectiveness of this patient securement device is independent of the patient's weight and is only limited by the angle of the decline. Therefore, due to the physical properties of the coefficient of friction, the patient securement device of the instant disclosure can accommodate patients of any size or weight, without limitation. The instructions for use of this device may only limit the angle of decline. Most known bolster-type patient securement devices are limited to certain weights, usually 300-400 pounds. The instructions for use of bolster-type devices limit both the angle of decline and weight of the patient.

In some embodiments, as shown in FIGS. 7 and 7A, the patient securement overlay 54 is advantageously anchored to at least a portion of the foot end of the section 12 of the surgical table mattress 30 that supports a torso of a patient 2 on a surgical table 4. In some embodiments, the patient securement overlay 54 is advantageously anchored to at least a portion of the foot end 10 of the underbody support 16. Anchoring the patient securement overlay 54 to at least a portion of the foot end 10 of the section 12 of the surgical table mattress 30 or underbody support 16 that supports the patient's torso creates a positive coupling between the two layers, when the patient is in the Trendelenburg position. Since a section 12 of the surgical table mattress 30 or underbody support 16 can be positively anchored to the surgical table 4 and the patient securement overlay 54 can be positively anchored to at least a portion of the foot end 10 of the underbody support 16 or to the surgical table mattress 30, the patient securement overlay 54 is thus positively and uniquely, indirectly anchored to the surgical table 4.

As shown in FIG. 3, the foot end 10 of the section 12 of the surgical table mattress 30 that supports the patient's torso on a surgical table 4 typically includes a perineal cutout 14 in the center of the foot end of section 12 of the surgical table mattress 30. The perineal cutout 14 of the section 12 of the surgical table mattress 30 is typically a tapering 3-6 inch recess in the foot end of the surgical table mattress 30 that is typically 10-14 inches wide at the open side of the recess and 4-8 inches wide at the closed side of the recess. Lateral to each side of the perineal cutout 14 are side extensions 56 of the surgical table mattress 30. The side extensions may extend approximately 4-6 inches out from each side of the perineal cutout 14. The perineal cutout 14 allows the patient's perineum to hang slightly over the end of the center of the surgical table mattress 30 while allowing side extensions 56 to provide support on the lateral aspects of the buttock when the patient's legs are up in stirrups. The perineal cutout 14 aids in unobstructed access to the perineum by the surgeon or robot.

In some embodiments, the perineal cutout 14 of the underbody support 16 may be a tapering 3-6 inch recess in the foot end of the underbody support 16 that may be 10-20 inches wide at the open side of the recess and 4-12 inches wide at the closed side of the recess.

In some embodiments, as shown in FIGS. 7 and 7A, the patient securement overlay 54 is advantageously anchored to at least a portion of the foot end 10 of the section 12 of the surgical table mattress 30 or underbody support 16 that supports the patient's torso on a surgical table 4, by a foot end extension 58 of the sheet of fabric 32 that wraps around at least a portion of the foot end 10 of the surgical table mattress 30 or underbody support 16 and is secured under the surgical table mattress 30 or underbody support 16. In some embodiments, the foot end extension 58 is a separate piece of material that is added to the patient securement overlay 54 as the anchor section.

In some embodiments, the width of the foot end extension 58 is less than the width of the patient securement overlay 54. In some embodiments, the width of the foot end extension 58 is advantageously approximately equal to the width of the closed side of the recess of the perineal cutout 14 of the surgical table mattress 30 or the underbody support 16. In some embodiments, the width of the foot end extension 58 may be between 4 and 20 inches. In some embodiments, the width of the perineal cutout 14 of the underbody support 16 may be greater than a width of the perineal cutout 14 of the surgical table mattress 30. When the perineal cutout 14 of the underbody support 16 is wider than the width of the perineal cutout 14 of the surgical table mattress 30, this may advantageously allow a wider and thus stronger foot end extension 58 of the sheet of fabric 32 to wrap around the perineal cutout 14 of the underbody support 16 and still fit within the perineal cutout 14.

In some embodiments, the patient securement overlay 54 is advantageously anchored to at least a portion of the head end 62 of the section 12 of the surgical table mattress 30 or underbody support 16 that supports the patient's torso, by a head end extension 60 of the sheet of fabric 32 that wraps around at least a portion of the head end 62 of the section 12 of the surgical table mattress 30 or underbody support 16 that supports the patient's torso and is secured under the surgical table mattress 30 or underbody support 16. In some embodiments, the head end extension 60 for anchoring the head end of the patient securement overlay 54 is a separate sheet of fabric that is added as an extension to the sheet of fabric 32.

In the Trendelenburg position, the force vector of the patient's weight is applied parallel to the direction of the sheet of fabric 32 that wraps around at least a portion of the foot end 10 of the section 12 of the surgical table mattress 30 or underbody support 16 that supports the patient's torso. In some embodiments, the anchoring mechanism at the foot end extension 58 of the sheet of fabric 32 that wraps around at least a portion of the foot end 10 of the section 12 of the surgical table mattress 30 or underbody support 16 that supports the patient's torso and is secured under the surgical table mattress 30 or underbody support 16, is applying a force vector that is directly opposite the direction of the force applied by the patient's weight when the patient is in the Trendelenburg position. The positive coupling provided by the foot end extension 58 of the sheet of fabric 32 that wraps around at least a portion of the foot end 10 of the section 12 of the surgical table mattress 30 or underbody support 16 that supports the patient's torso and is secured under the surgical table mattress 30 or underbody support 16 does not stretch or flex and therefore substantially limits (e.g., does not allow) slippage or deformation between the patient securement overlay 54 and the surgical table mattress 30 or underbody support 16. In some embodiments, the anchoring mechanism at the foot end 10 of the section 12 of the surgical table mattress 30 or underbody support 16 that supports the patient's torso, creates an anchoring force vector that is advantageously directly opposite the force vector of the patient sliding down the incline of the surgical table 4 in the Trendelenburg position. This is in contrast to known securement pads 26 where the anchoring force vector is sideways or perpendicular to the force vector of the patient sliding down the incline of the surgical table 4 in the Trendelenburg position. A perpendicular force vector to prevent sliding is not nearly as secure as a parallel force vector.

In some embodiments, wrapping the anchoring the sheet of fabric 32 around the foot end of the surgical table mattress 30, creates a substantially vertical anchor segment at the foot end of the mattress, that is oriented perpendicular to the force vector of the weight of the patient sliding down the incline of a surgical table in the Trendelenburg position. In the instance of the mattress not being adequately secured to the table, or any slippage between the layers of materials that form the mattress, or crushing and dislocation of the foam of the mattress, the perpendicular orientation of the anchoring the sheet of fabric 32 around the foot end of the surgical table mattress 30 cannot prevent the patient from moving down the inclined surgical table. In some embodiments, the problem with anchoring the sheet of fabric 32 around the foot end of the surgical table mattress 30, is that under a heavy load (such as >300 lbs.) in a steep Trendelenburg position (such as >35°), the force of the patient's weight pulling on the anchoring the sheet of fabric 32 around the foot end of the surgical table mattress 30, crushes the foam of the upper foot edge of a 3 or 4 inch thick surgical mattress pad, until the sheet of fabric 32 at the foot end of the surgical table mattress 30 reaches an angle of approximately 45-55° relative to the surgical table top. At this angle the force vector is adequate to prevent further sliding, however, the patient will have slid 3-4 inches down the inclined surgical table before stabilizing. A 3-4-inch slide is unacceptable if it occurs mid-surgery.

In some embodiments, the foot end extension 58 and head end extension 60 of the sheet of fabric 32 for respectively wrapping around at least a portion of the foot end 10 and head end 62 of the surgical table mattress 30 or underbody support 16, includes one or more elements that improve the friction bond between the foot end extension 58 and head end extension 60 and either or both of the underside of the underbody support 16, the section 12 of the surgical table mattress 30 that supports the patient's torso and/or the surgical table top 64. In some embodiments, the one or more elements that improve this friction bond include a low tack adhesive or three-dimensional friction-enhancing elements, that can be plastic or rubber, applied to the foot end extension 58 and head end extension 60 of the sheet of fabric 32.

Any low tack adhesives known in the art can be used to improve this friction bond, including but not limited to those adhesives used on Post-it Notes® (available from 3M Corporation), for example. Plastic or rubber three-dimensional friction-enhancing elements that can be used include but are not limited to: silicone, viscoelastic polyurethane foams, viscoelastic PVC foams, other viscoelastic polymeric foams, urethane, PVC, as well as other polymers and rubbers. The friction-enhancing elements 34, which can be three-dimensional friction-enhancing elements, may be applied to foot end extension 58 and head end extension 60 of the sheet of fabric 32, or may be a separate piece of fabric that is adhesively bonded, heat bonded, or sewn to the sheet of fabric 32 forming foot end extension 58 and head end extension 60.

In some embodiments, the neck 70 of the sheet of fabric 32 or the foot end extension 58 at the foot end of the sheet of fabric 32 that joins the foot end of the sheet of fabric 32 to the anchor 66 (which can be plastic, metal, fiberboard, or other suitable materials) may be strengthened by melting and compressing the friction-enhancing elements, such as PVC foams, viscoelastic PVC foams, viscoelastic polyurethane foams, or polyurethane foams into the form of a film. Compressing these materials in a heated press or RF press will collapse the foam structure and convert the material to resemble a film. The film-like structure is stronger than the foam structure and may, in some applications, be a superior configuration for wrapping around the end of the surgical table mattress 30 or underbody support 16.

In some embodiments, as shown in FIG. 15, the layer of flexible foam material 52 may be adhesively laminated to the upper surface 36 of the sheet of fabric 32. Laminating the layer of flexible foam material 52 to the sheet of fabric 32 advantageously utilizes the positive, non-slip anchoring of the sheet of fabric 32 or foot end extension 58 wrapping around the foot end 10 of the section 12 of the surgical table mattress 30 or underbody support 16 that supports the patient's torso, positively capturing the sheet of fabric 32 or foot end extension 58 between the underbody support 16 and the surgical table mattress 30 or the surgical table mattress 30 and the surgical table top 64. When the sheet of fabric 32 is positively anchored, the layer of flexible foam material 52 is also positively anchored (e.g., laminated to the upper surface of the sheet of fabric 32). This is in contrast to known pad straps 28A, 28B that anchor a layer of flexible foam material to the side rails 20 of the surgical table 4, as shown in FIG. 6. The sheet of fabric 32 also strengthens the layer of flexible foam material 52, allowing the layer of flexible foam material 52 to be relatively thin, for example from 0.25-0.75 inches thick. The sheet of fabric 32 prevents the layer of flexible foam material 52 from tearing, stretching or deforming under the weight of a patient that is in the Trendelenburg position.

In some embodiments, the layer of flexible foam material 52 may be any type of suitable foam material. In some embodiments, the layer of flexible foam material 52 may be a viscoelastic urethane foam or a urethane upholstery foam. Other foam materials including other viscoelastic foam materials are anticipated and can be used as the layer of flexible foam material 52. The layer of flexible foam material 52 may have any thickness between about 0.25 inches and about 3 inches. In some embodiments, the layer of flexible foam material 52 can be less than 0.5 inches thick.

In some embodiments, a method of supporting and restricting a sliding motion of a patient 2 on a surgical table 4 is provided. The method can include the steps of: (i) providing an underbody support 16 configured to support the patient 2 on the surgical table 4, the underbody support 16 including a compressible material layer having an upper surface configured to face the patient 2 opposite a base layer having a lower surface configured to face the surgical table 4; (ii) coupling the underbody support 16 to the surgical table 4; (iii) placing a sheet of fabric 32 between the upper surface of the underbody support 16 and the patient 2, the sheet of fabric 32 comprising friction-enhancing elements 34 on one or both sides of the sheet of fabric 32, wherein the sheet of fabric 32 is configured to grip both the underbody support 16 and the patient 2 to prevent the patient from inadvertently slipping off of the underbody support 16; and (iv) positioning the patient 2 on the underbody support 16.

In some embodiments, it may be advantageous to secure the sheet of fabric 32 or other securement overlay, to the side rails 20 of the surgical table 4. Securing to the side rails 20 of the surgical table 4 is not a new idea—for example Pigazzi discloses securing a patient securement device by straps to the side rails 20, in U.S. Pat. No. 8,464,720. We disclose securing a mattress overlay device by straps to the side rails 20, in U.S. Pat. No. 10,765,580. In both of these prior art examples, the device was secured to the side rails 20 by straps 18.

FIGS. 5 and 6 show a mattress overlay 26 of the Pigazzi design using straps 28A and 28B to secure the overlay to the siderails of the surgical table 4. FIG. 6 also shows the mattress overlay 26 of the Pigazzi design slipping against the mattress 12 and sliding toward the head end when in the head-down Trendelenburg position—a problem that is well-known with the Pigazzi design.

Figure 16:
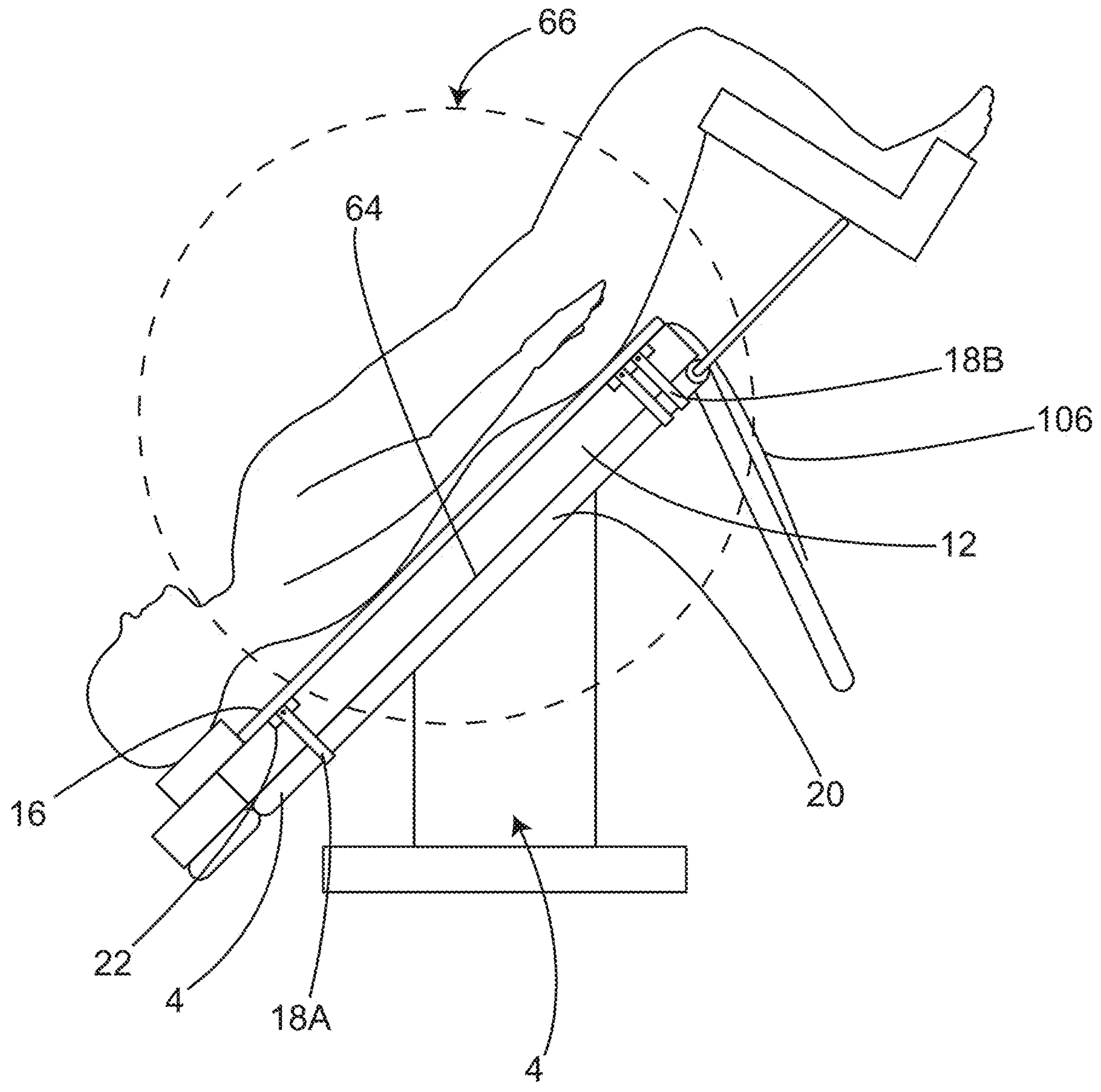
FIG. 16 is a side view of a patient laying on a surgical table and securement pad, in the lithotomy and Trendelenburg positions in accordance with illustrative embodiments.

FIGS. 17-21 are magnified views of the focus area 66 as shown in FIG. 16.

Figure 17:
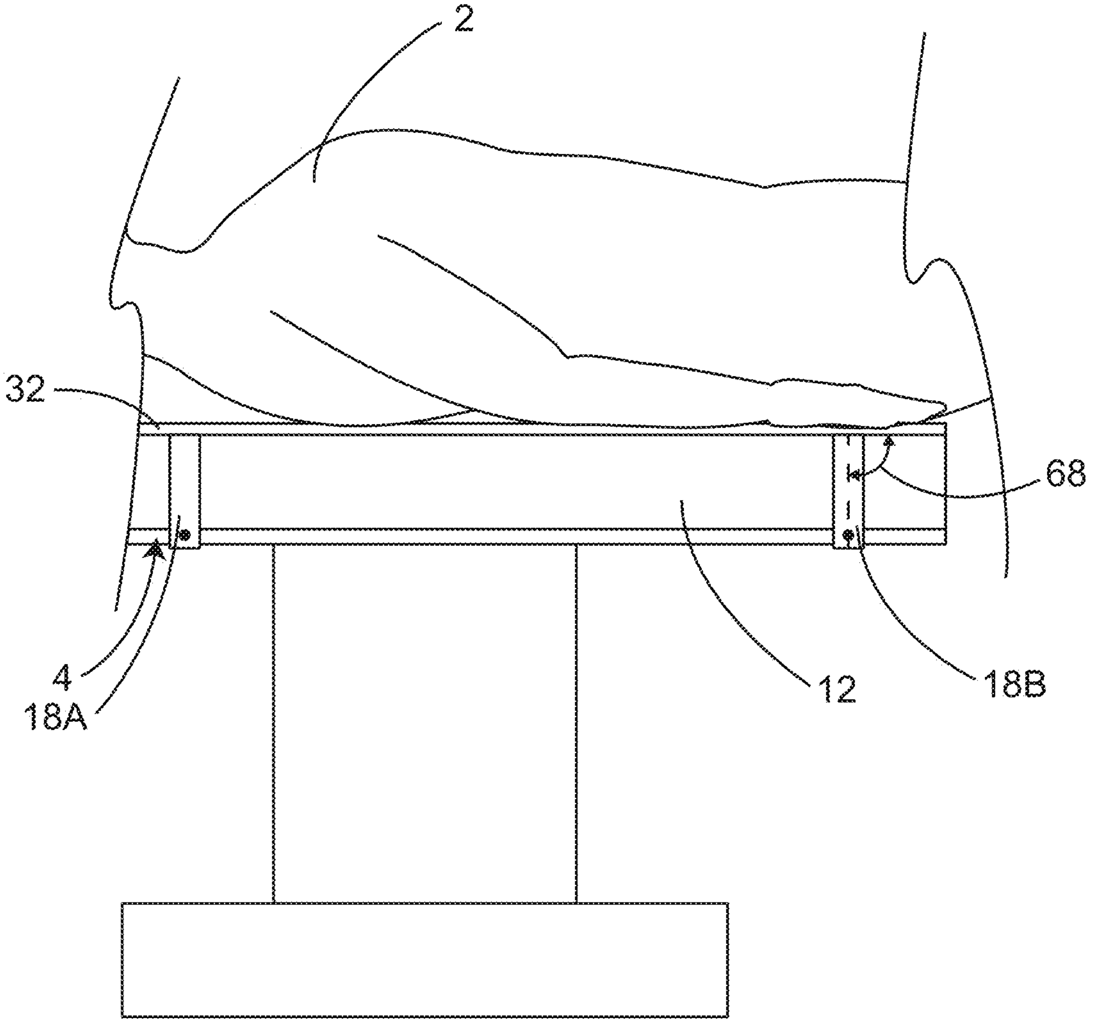
FIG. 17 is a side view of a patient laying on a surgical table and securement pad, in accordance with illustrative embodiments.

As shown in FIG. 17, the patient 2 may start on a level surgical table 4 and the perpendicular straps 18A and 18B adequately secure the patient 2, the sheet of fabric 32 and the surgical table mattress 12 in position. With a level surgical table 4, there is no force attempting to move the patient toward either the foot or head end of the surgical table 4. The retaining force vector angle 68 (the angle between the strap 18B and the sheet of fabric 32) is approximately 90° which is the worst angle possible for preventing sliding down an inclined tabletop. Ideally, the best retaining force vector angle 68 would be 0° which is parallel to the sheet of fabric 32 and most directly opposes sliding down an inclined tabletop. When the surgical table 4 is level, the foot end of mattress 32 may match up with the foot end of the torso section of table 4.

Figure 18:
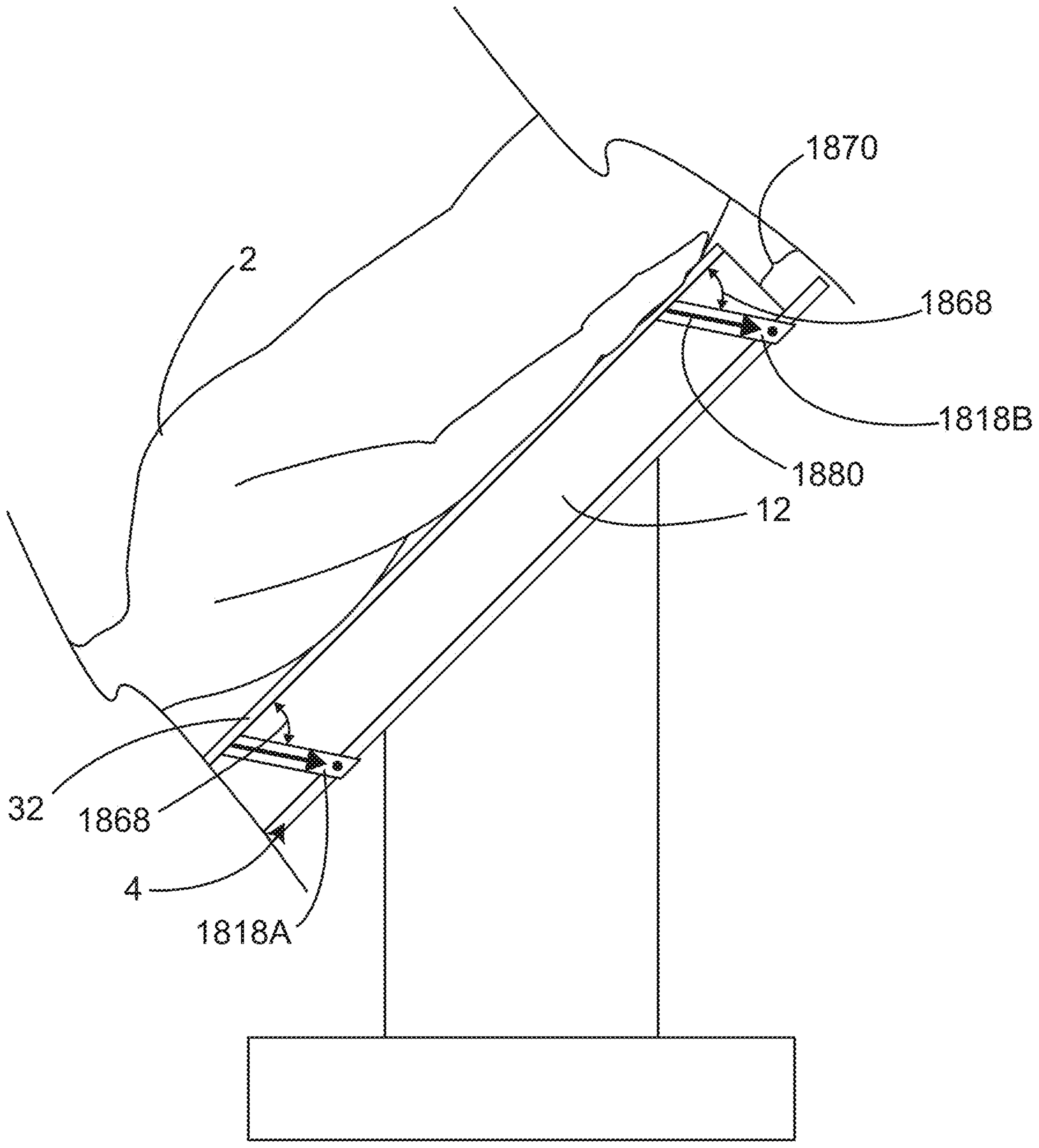
FIG. 18 is a side view of a patient laying on a surgical table and securement pad, in the lithotomy and Trendelenburg positions in accordance with illustrative embodiments.

As shown in FIG. 18, straps 1818A and 1818B may not adequately prevent one or more of: the sheet of fabric 32 from sliding against the mattress 12, or the mattress 12 from sliding against the surgical table 4, or the layers of materials that form the mattress 12 from sliding against each other, or the foam of the mattress 12 from compressing and deforming under the pressure. FIG. 18 illustrates the example of the mattress 12 sliding on the surgical table 4 when the head end of the surgical table 4 is tilted downward into the "Trendelenburg" position. As shown in FIG. 18, the straps 1818A and 1818B connected between the sheet of fabric 32 and the side rails of surgical table 4, will shift from a perpendicular orientation and deform until they form a retaining force vector angle 1868 of 45-55° relative to the sheet of fabric 32, to create a force vector that can oppose the weight of the patient 2 from sliding down the surgical table 4 incline. If the mattress 12 is not adequately secured to the surgical table 4, the inevitable result of the straps 1818A and 1818B rotating is that the mattress 12 is allowed to slide down the surgical table 4 incline, creating a mattress movement 1870.

We tested under the severe conditions of a 400 lb. "patient" on a 45° incline with the mattress 12 unsecured to the top of surgical table 4 as would be the case if the Velcro that normally secures a mattress 12 to the surgical table 4 was old and damaged. Under these severe conditions, independent straps 1818A and 1818B secured to the four corners of the sheet of fabric 32 will allow the mattress 12 to slip approximately 4 in. down the table (mattress movement 1870), before stopping the sliding motion.

Figure 19:
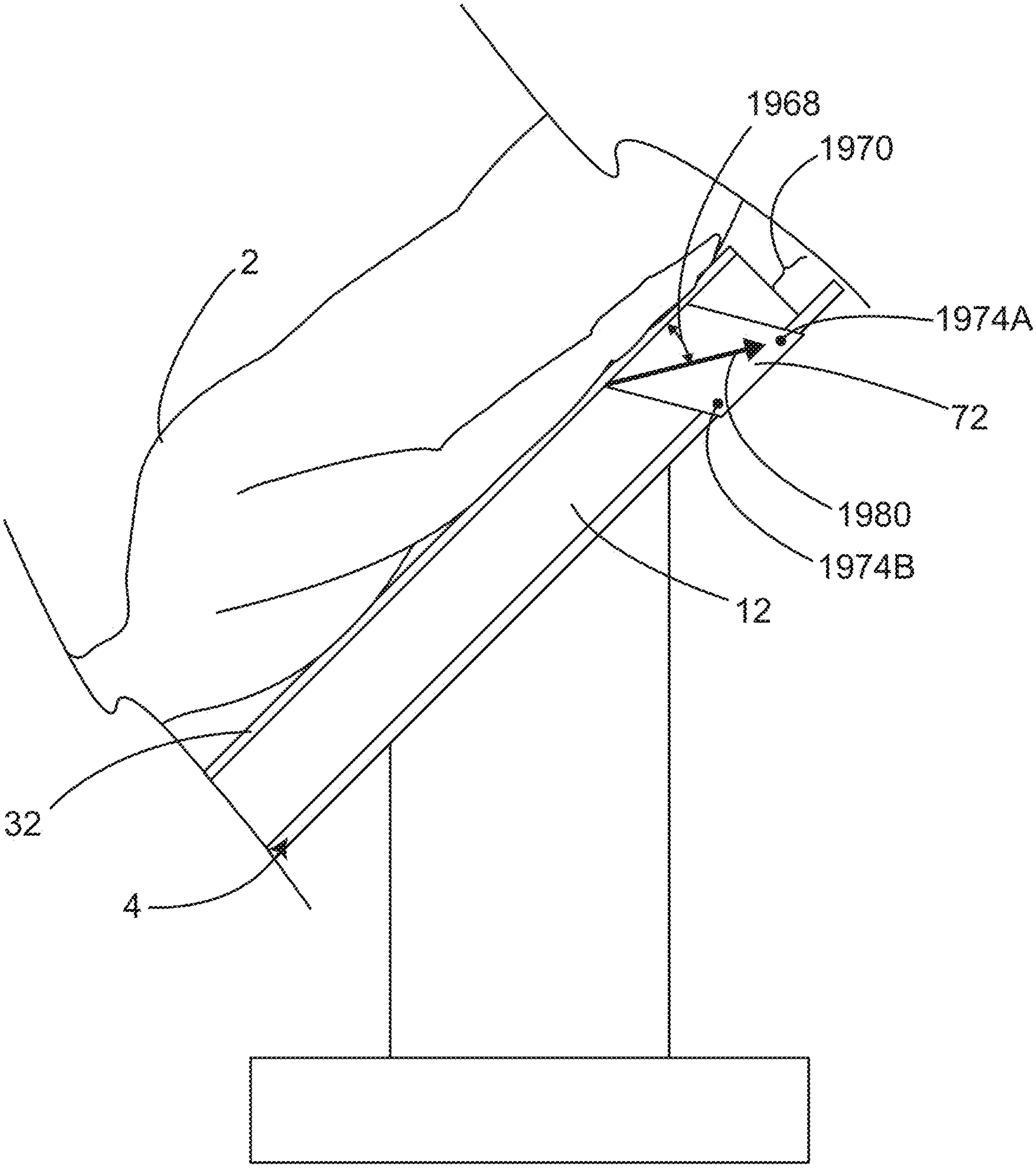
FIG. 19 is a side view of a patient laying on a surgical table and securement pad, in the lithotomy and Trendelenburg positions in accordance with illustrative embodiments.

FIG. 19 also illustrates an example of the mattress 12 sliding on the surgical table 4 when the head end of the surgical table 4 is tilted downward into the "Trendelenburg" position. In some examples, as shown in FIG. 19, the straps 1818A and 1818B may be replaced by side flaps 72. In some examples, as shown in FIG. 19, side flaps 72 may be connected between the sheet of fabric 32 and the side rails of surgical table 4 near the foot end of the sheet of fabric 32. In contrast to individual straps like 1818A and 1818B that can easily rotate, side flaps 72 are made of a sheet of strong but flexible material that extends between attachment points 1974A and 1974B and naturally resists rotating. Instead of creating a favorable retaining force vector angle 1968 by rotating the straps 1818A and 1818B to an approximately 45° angle, some examples of an invention of this disclosure fill in the space between imaginary straps with side flap 72 material that creates a more favorable force vector 1980 and more favorable retaining force vector angle 1968 of <45° with moderate but <45° rotation. When rotation is minimized, the mattress movement 1970 is also minimized.

We tested under the severe conditions of a 400 lb. "patient" on a 45° incline and with the mattress 12 unsecured to the top of surgical table 4. Under these conditions, side flaps 72 secured to each side of the sheet of fabric 32 near the foot end and attached to the side rails of the surgical table 4 at attachment points 1974A and 1974B, allowed the mattress 12 to slip approximately 2 in. down the table (mattress movement 1970), before stopping the sliding motion. 2 in. of mattress movement 1970 is exactly half of the 4 in. of mattress movement 1870 observed with straps 1818A and 1818B.

Figure 20:
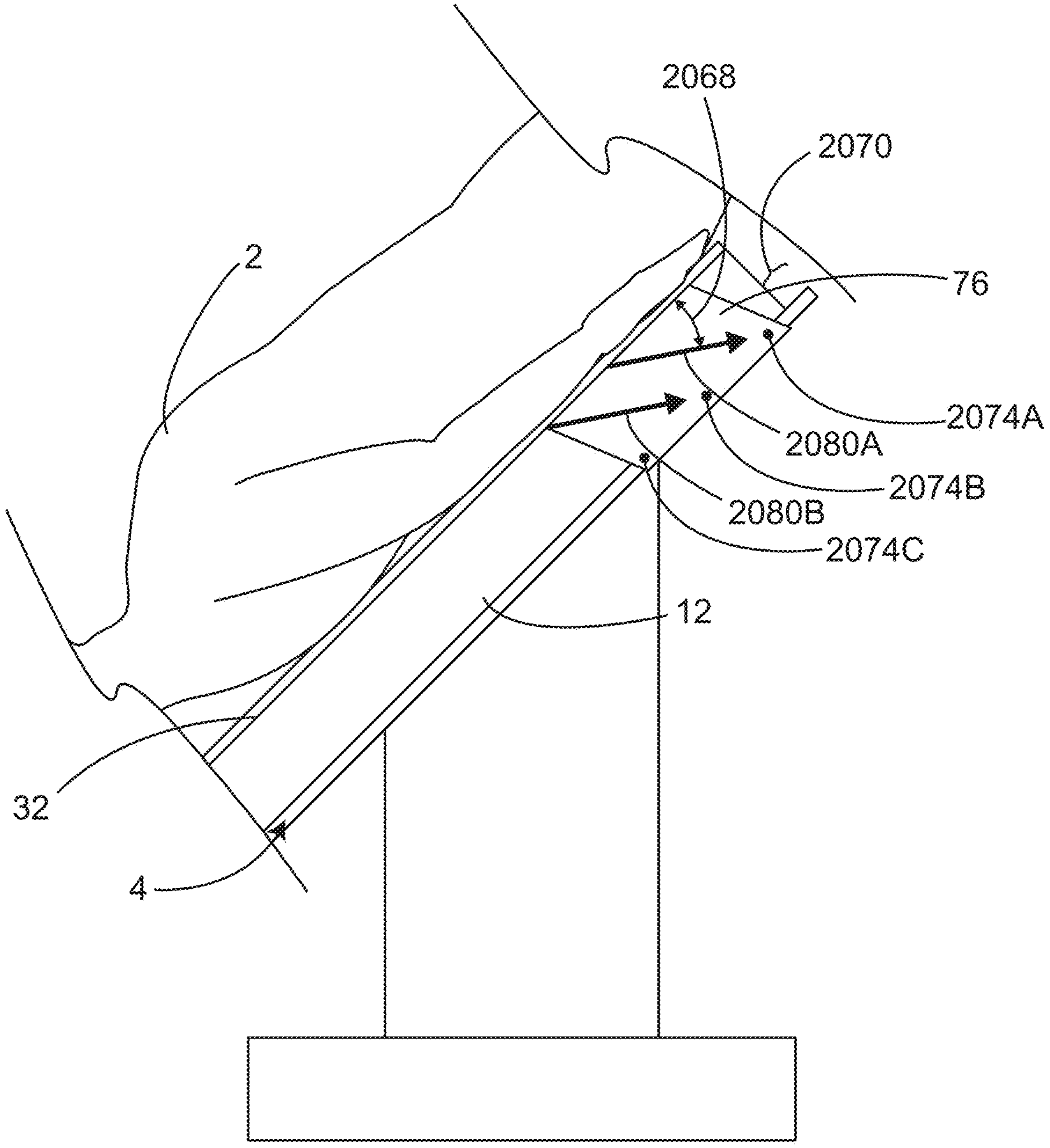
FIG. 20 is a side view of a patient laying on a surgical table and securement pad, in the lithotomy and Trendelenburg positions in accordance with illustrative embodiments.

FIG. 20 also illustrates an example of the mattress 12 sliding on the surgical table 4 when the head end of the surgical table 4 is tilted downward into the "Trendelenburg" position. In some examples, as shown in FIG. 20, the straps 1818A and 1818B may be replaced by side flaps 76. In some examples, as shown in FIG. 20, side flaps 76 may be connected between the sheet of fabric 32 and the side rails of surgical table 4 near the foot end of the sheet of fabric 32. In contrast to FIG. 19, the example in FIG. 20 connects to the side rails of surgical table 4 at three attachment points 2074A, 2074B and 2074C. In contrast to individual straps like 1818A and 1818B that can easily rotate, side flaps 76 are made of a sheet of strong but flexible material that extends between attachment points 2074A, 2074B and 2074C and naturally resists rotation. Instead of creating a favorable retaining force vector angle 1868 by rotating the straps 1818A and 1818B to an approximately 45° angle, some examples of an invention of this disclosure fill in the space between attachment points 2074A, 2074B and 2074C with side flap 72 material that creates a more favorable force vectors 2080A and 2080B and more favorable retaining force vector angles 2068 of <45° with <45° rotation. When rotation is minimized, the mattress movement 2070 is also minimized.

We tested under the severe conditions of a 400 lb. "patient" on a 45° incline and with the mattress 12 unsecured to the top of surgical table 4. Under these conditions, side flaps 76 secured to each side of the sheet of fabric 32 near the foot end and attached to the side rails of the surgical table 4 at attachment points 2074A, 2074B and 2074C, allowed the mattress 12 to slip approximately 1 in. down the table (mattress movement 2070), before stopping the sliding motion. 1 in. of mattress movement 2070 is exactly ¼ of the 4 in. of mattress movement 1870 observed with straps 1818A and 1818B.

Figure 21:
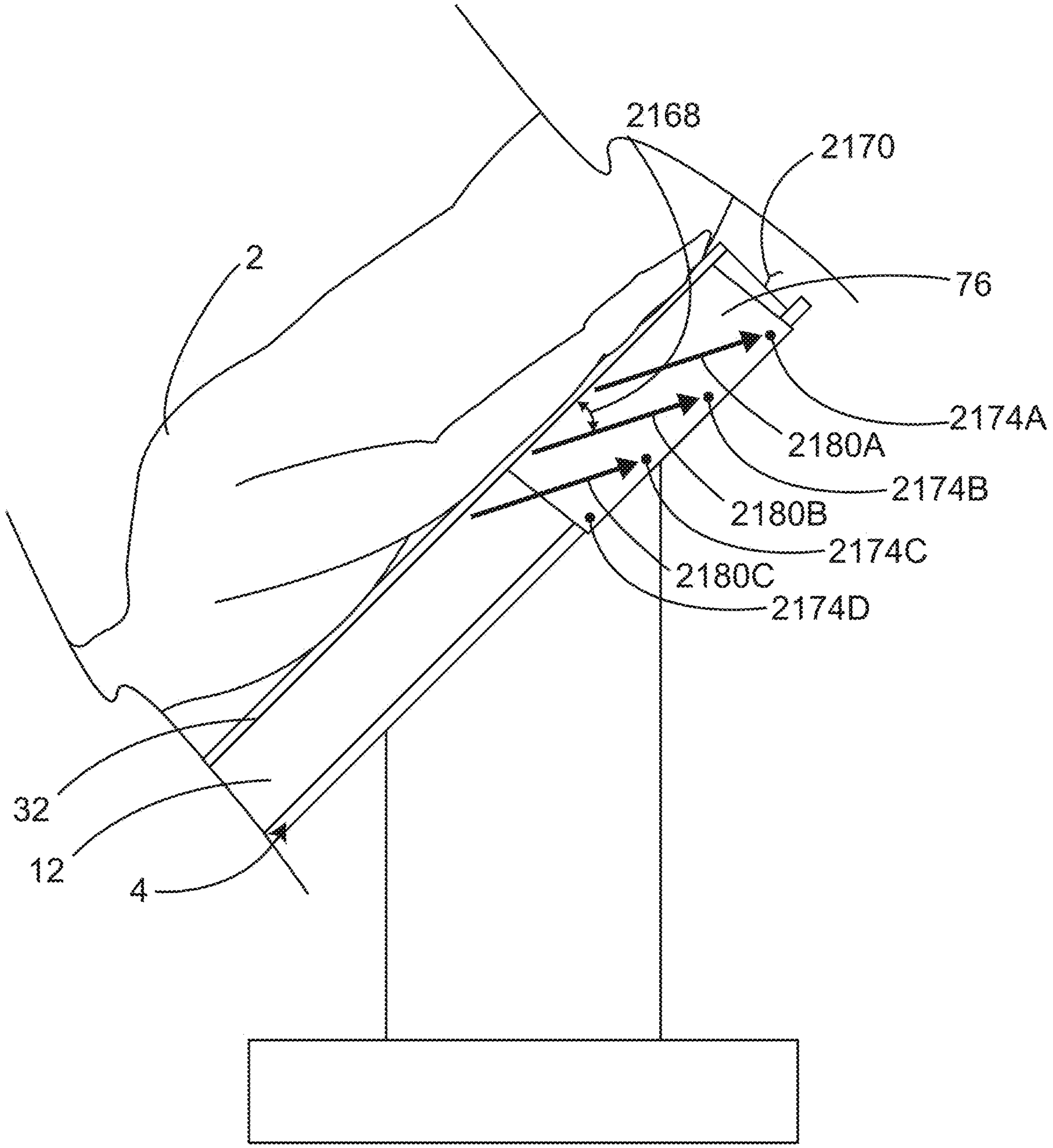
FIG. 21 is a side view of a patient laying on a surgical table and securement pad, in the lithotomy and Trendelenburg positions in accordance with illustrative embodiments.

FIG. 21 also illustrates an example of the mattress 12 sliding on the surgical table 4 when the head end of the surgical table 4 is tilted downward into the "Trendelenburg" position. In some examples, as shown in FIG. 21, the straps 1818A and 1818B may be replaced by side flaps 78. In some examples, as shown in FIG. 21, side flaps 78 may be connected between the sheet of fabric 32 and the side rails of surgical table 4 near the foot end of the sheet of fabric 32. In contrast to FIG. 20, the example in FIG. 21 connects to the side rails of surgical table 4 at four attachment points 2174A, 2174B, 2174C and 2174D. In contrast to individual straps like 1818A and 1818B that can easily rotate, side flaps 78 are made of a sheet of strong flexible material that extends between attachment points 2174A, 2174B, 2174C and 2174D and naturally resist rotation. Instead of creating a favorable retaining force vector angle 1868 by rotating the straps 1818A and 1818B to an approximately 45° angle, some examples of an invention of this disclosure fill in the space between attachment points 2174A, 2174B, 2174C and 2174D with side flap 72 material that creates a more favorable force vectors 2180A, 2180B and 2180C and more favorable retaining force vector angle 2168 of <45° with <<<45° rotation. When rotation is minimized, the mattress movement 2170 is also minimized.

We tested under the severe conditions of a 400 lb. "patient" on a 45° incline and with the mattress 12 unsecured to the top of surgical table 4. Results of this testing are shown below at Table 1. Under these conditions, side flaps 78 secured to each side of the sheet of fabric 32 near the foot end and attached to the side rails of the surgical table 4 at attachment points 2174A, 2174B, 2174C and 2174D, allowed the mattress 12 to slip approximately ½ in. down the table (mattress movement 2170), before stopping the sliding motion. ½ in. of mattress movement 2170 is exactly ⅛ of the 4 in. of mattress movement 1870 observed with straps 1818A and 1818B.

Figure 22:
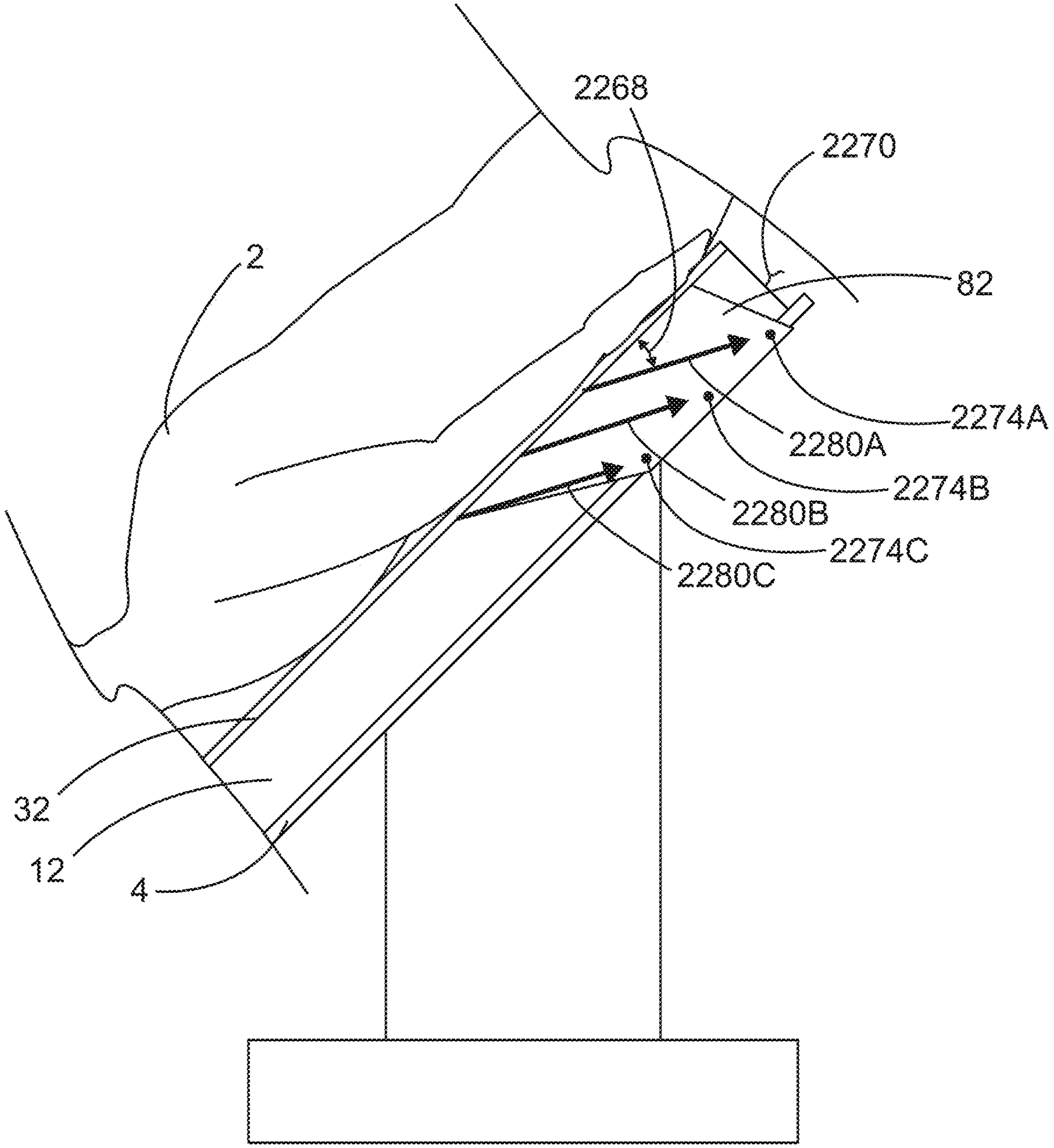
FIG. 22 is a side view of a patient laying on a surgical table and securement pad, in the lithotomy and Trendelenburg positions in accordance with illustrative embodiments.

As shown in FIG. 22, the advantageous retaining force vector angle 68 of <45° and with <<<45° rotation, demonstrated in FIG. 21 with four attachment points 2174A, 2174B, 2174C and 2174D, can be essentially duplicated with three attachment points 2274A, 2274B and 2274C, if side flap material 82 is extended past attachment point 2274C toward the head end. The extension of side flap material 82 allows the force vector 2280C between attachment point 2274C and the sheet of fabric 32 to create a favorable retaining force vector angle 2268 in contrast to attachment point 2174D of FIG. 21, which adjacent the edge of the side flap material 78.

TABLE 1

| Side securement option | Measured mattress 12 movement 70, under 400 lb. "patient," 45° incline and mattress 12 unsecured to the top of surgical table 4 |
|---|---|
| 4 independent straps (FIG. 18) | ~4 in. |
| 2 side flaps 72 with 2-hole attachment points (74A, 74B) (FIG. 19) | ~2 in. |
| 2 side flaps 76 with 3-hole attachment points (74A, 74B, 74C) (FIG. 20) | ~1 in. |
| 2 side flaps 78 with 4-hole attachment points (74A, 74B, 74C, 74D) (FIG. 21) | ~½ in. |
| 2 side flaps 82 with 3-hole attachment points (74A, 74B, 74C) and head end extensions of side flap material (FIG. 22) | ~½ in. |

Figure 26:
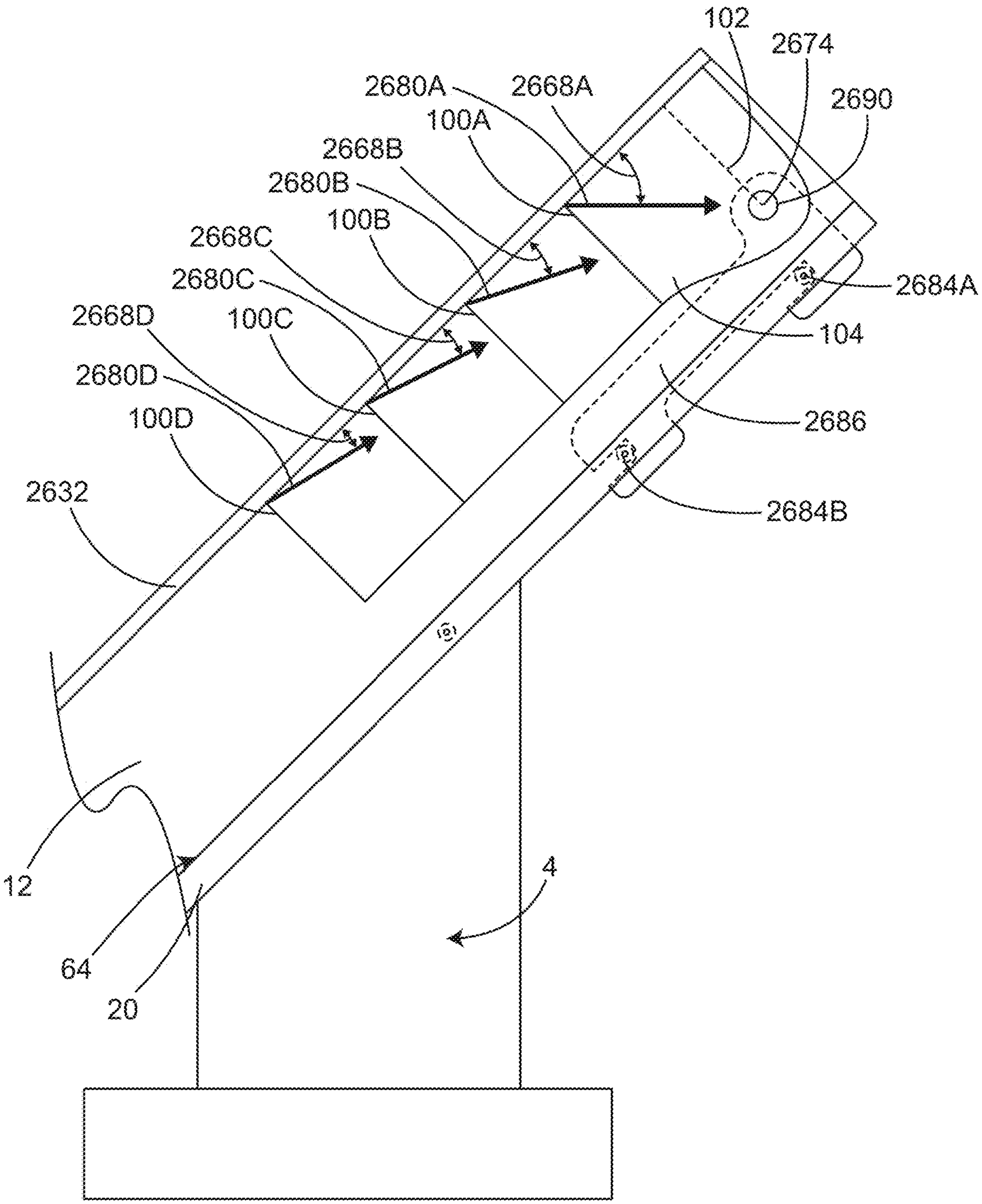
FIG. 26 is a side view of a surgical table and securement pad, in the Trendelenburg position in accordance with illustrative embodiments.

In some examples, the advantage of smaller retaining force vector angles can be summarized in FIG. 26. A side flap 104 with a single side flap hole 2690 is shown attached to a sheet of fabric 2632. Side flap 104 is attached to attachment bracket 2686 at attachment point 2674. Dotted line 102 represents a perpendicular line between attachment point 2674 and sheet of fabric 2632. If the side flap 104 extended to side flap end point 100A (the same distance as from attachment point 2674 to the sheet of fabric 2632), the effective force vector 2680A that resists the movement of the sheet of fabric 2632 and/or mattress 12 down the surgical table incline due to the weight of a patient is at retaining force vector angle of 45°.

In some examples as shown in FIG. 26, if the side flap 104 extended to side flap end point 100B (2× the distance from attachment point 2674 to the sheet of fabric 2632), the effective force vector 2680B that resists the movement of the sheet of fabric 2632 and/or mattress 12 down the surgical table incline due to the weight of a patient is at retaining force vector angle 2668B of 26.6°, a significant improvement over 45° in the first example.

In some examples as shown in FIG. 26, if the side flap 104 extended to side flap end point 100C (3× the distance from attachment point 2674 to the sheet of fabric 2632), the effective force vector 2680C that resists the movement of the sheet of fabric 2632 and/or mattress 12 down the surgical table incline due to the weight of a patient is at retaining force vector angle 2668C of 18.4°, which is an improvement over 26.6° in the second example.

In some examples as shown in FIG. 26, if the side flap 104 extended to side flap end point 100D (4× the distance from attachment point 2674 to the sheet of fabric 2632), the effective force vector 2680D that resists the movement of the sheet of fabric 2632 and/or mattress 12 down the surgical table incline due to the weight of a patient is at retaining force vector angle 2668D of 14°, which is a slight improvement over 18.4° in the third example. In some examples, there is a diminishing return in retaining force vector angles 2668A-D by making the side flap 104 progressively longer.

Figure 24:
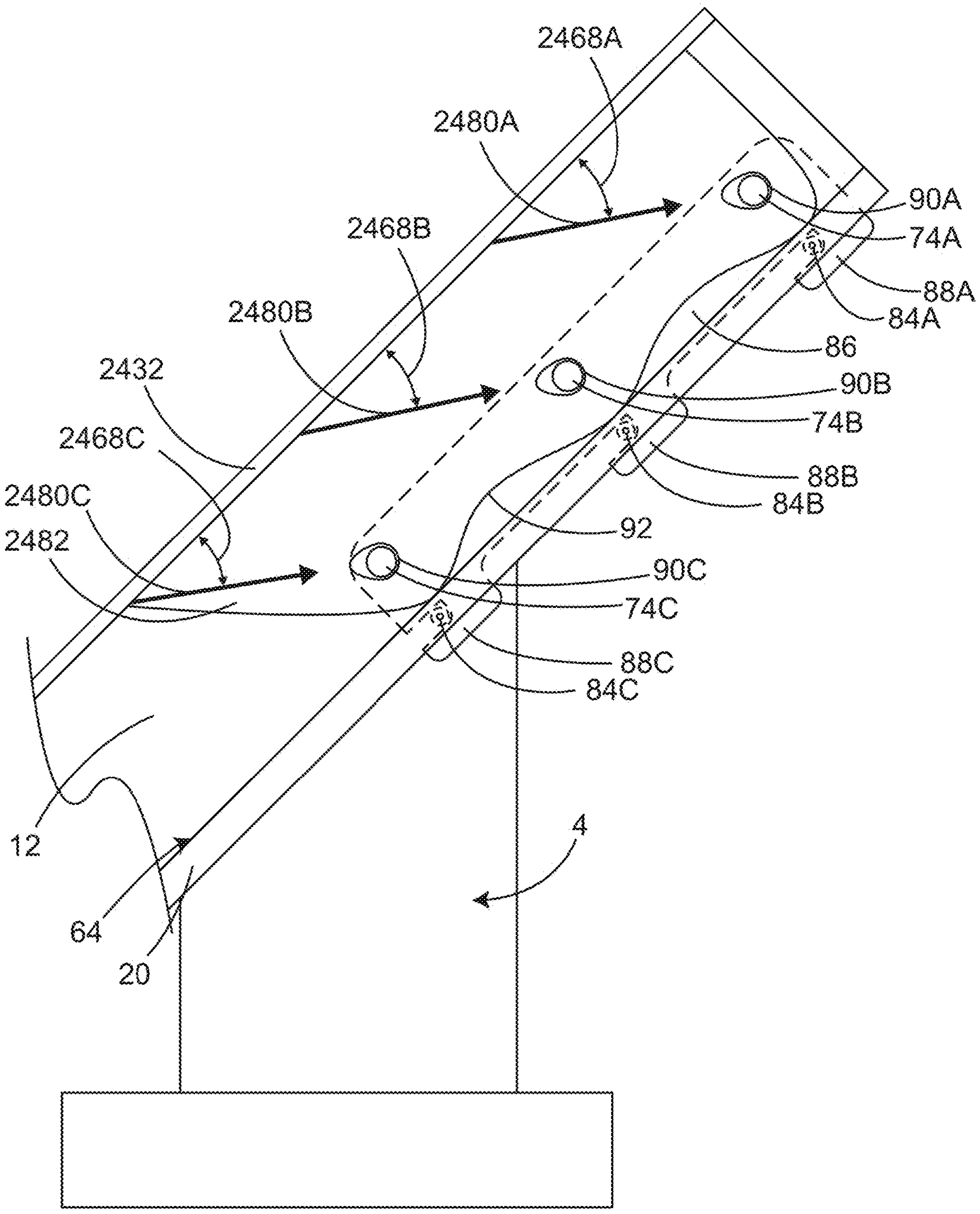
FIG. 24 is a side view of a surgical table and securement pad, in the Trendelenburg position in accordance with illustrative embodiments.
Figure 27:
FIG. 27 is a side view photograph of a surgical table bench test and securement pad, in the Trendelenburg position in accordance with illustrative embodiments.

FIG. 27 is a photograph of a prototype of one example of this disclosure. The photo shows a test bed at 45° with a surgical table mattress attached. There is a sheet of fabric (the white line of material) between the mattress and the bags of sand the represent a patient. Side flaps with three attachment points to an attachment bracket are shown. The force vectors can be clearly seen as stretching of the side flap material, starting at the attachment point and angling up to the sheet of fabric. In this example, the distance between the side flap end point to the right of the righthand attachment point is roughly ½ the distance between the attachment points (this configuration is also shown in FIG. 24). The shorter distance results in a significantly greater retaining force vector angle at the righthand attachment point compared to the left and center attachment points. Greater retaining force vector angles are less effective at resisting the downward sliding force.

In some examples, the sheet of fabric 32 can be made of a wide variety of woven and non-woven fabrics including but not limited to polyester, polypropylene, rayon and cotton. The friction enhancing elements have been previously discussed in this disclosure. It is also anticipated that the sheet of fabric 32 can be made of plastic film such as PVC or polyurethane. It is also anticipated that the sheet of fabric 32 can be made of plastic film such as PVC or polyurethane that has been reinforced with a woven or non-woven fabric layer.

In some examples, the sheet of fabric 32 may be coated with foam bumps, silicone bumps or other friction enhancing elements 34 that help to secure the patient 2 to the sheet of fabric 32. In some examples as shown in FIG. 15, a layer of foam 52 may be adhesively or heat bonded to the sheet of fabric (or film) 32. In this example, the layer of foam 52 is the friction enhancing element 34 that helps to secure the patient 2 to the sheet of fabric 32. In some examples as shown in FIG. 15, layer 52 could be a layer of gel material that may be bonded to the sheet of fabric (or film) 32. In this example, the gel layer 52 is the friction enhancing element 34 that helps to secure the patient 2 to the sheet of fabric 32. In some examples as shown in FIG. 15, layer 52 could be a layer of minimally tacky adhesive or other minimally tacky substance that may be bonded to the sheet of fabric (or film) 32. In this example, the minimally tacky adhesive or substance layer 52 is the friction enhancing element 34 that helps to secure the patient 2 to the sheet of fabric 32.

In some examples, such as when the sheet of fabric 32 is coated with foam bumps, silicone bumps or other friction enhancing elements 34, the sheet of fabric 32 may be sized to cover most or all of the torso section of the surgical table mattress 12. In some examples, the sheet of fabric 32 may extend beyond the ends or sides of the torso section of the surgical table mattress 12. In these examples, the side flaps 72, 76, 78 and 82 may be made of a different material such as fabric-reinforced plastic film for example and the side flaps 72, 76, 78 and 82 may be attached to the sheet of fabric 32 along the side edges.

In some examples, such as when the sheet of fabric 32 is a base layer onto which a layer of foam has been bonded as shown in FIG. 15 to form the friction enhancing element, the sheet of fabric 32 may be larger than the foam layer 52 or it may be the same size as the foam layer 52 or it may be smaller than the foam layer 52. In some examples, the sheet of fabric 32 may be a strip of material such as one or more belts that connect the side flaps 72, 76, 78 and 82 on one side to the side flaps 72, 76, 78 and 82 on the other side. The one or more strips of material can be bonded to the foam layer 52.

In some examples, the sheet of fabric 32 may be made of the same material as the side flaps 72, 76, 78 and 82 or may even be cut from the same piece of material as the side flaps 72, 76, 78 and 82, eliminating the need of for bonding the sheet of fabric 32 to the side flaps 72, 76, 78 and 82. For example, the two-holed side flaps 72 shown in FIG. 19 may be the ends of a strip of material (a wide belt) that crosses the surgical table above the mattress 12 and is bonded to the underside of the sheet of fabric 32 or foam layer 52.

In some examples, the side flaps 72, 76, 78 and 82, are made of fabric-reinforced plastic film. The reinforcing fabric may be made of a wide variety of woven and non-woven fabrics or scrims including but not limited to polyester, polypropylene, rayon, nylon and cotton. In some examples, it may be preferable to make the side flaps 72, 76, 78 and 82 out of a woven polyester fabric that has been extrusion coated with PVC or polyurethane film. The fabric reinforcement in conjunction with the film layers minimizes the diagonal stretching of the side flaps 72, 76, 78 and 82. The fabric layer strengthens and prevents tearing of the film layer while the film layers stabilize and prevent stretching, especially diagonal stretching of the fibrous layer. The fabric reinforcement in conjunction with the film layers also creates durable, minimally stretching and non-tearing attachment points 74—the entire side flap may become essentially a wide belt. Other fibrous reinforcing layer and film layer materials are anticipated. Multiple layers are also anticipated.

In some examples, the side flaps 72, 76, 78 and 82 may be attached to the sheet of fabric 32 using an RF welding process if the materials are similar. For example, a sheet of fabric 32 made of a PVC foam applied to a woven fibrous scrim can be RF welded to fiber-reinforced PVC film side flaps 72, 76, 78 and 82, creating a strong but inexpensive bond. Similarly, urethane foams can be RF welded or heat bonded to urethane films.

In some examples, the side flaps 72, 76, 78 and 82 may be attached to the sheet of fabric 32 using sewing or adhesives. Other attachment mechanisms are anticipated, including but not limited to: snaps, hooks, hook and loop (Velcro) and buttons.

In some examples, the side flaps 72, 76, 78 and 82 may be attached to a mattress overlay 16, a heated mattress overlay 16 or even a surgical table mattress 12, in order to secure the overlay 16 or mattress 12 to the surgical table 4. The securement method of this disclosure may be especially important in the case of surgical table mattresses 12 that are losing their attachment to the surgical table 4 because of failing Velcro. It is well-known that the repeated connection, disconnection and cleaning of the standard Velcro surgical table mattress 12 attachments can lead to Velcro failure, in which case the surgical table mattress 12 can slide freely off of the surgical table 4. The securement method of this disclosure can provide either a backup safety securement or primary securement of the mattress 12 or mattress overlay 16 to the surgical table 4.

Figure 23:
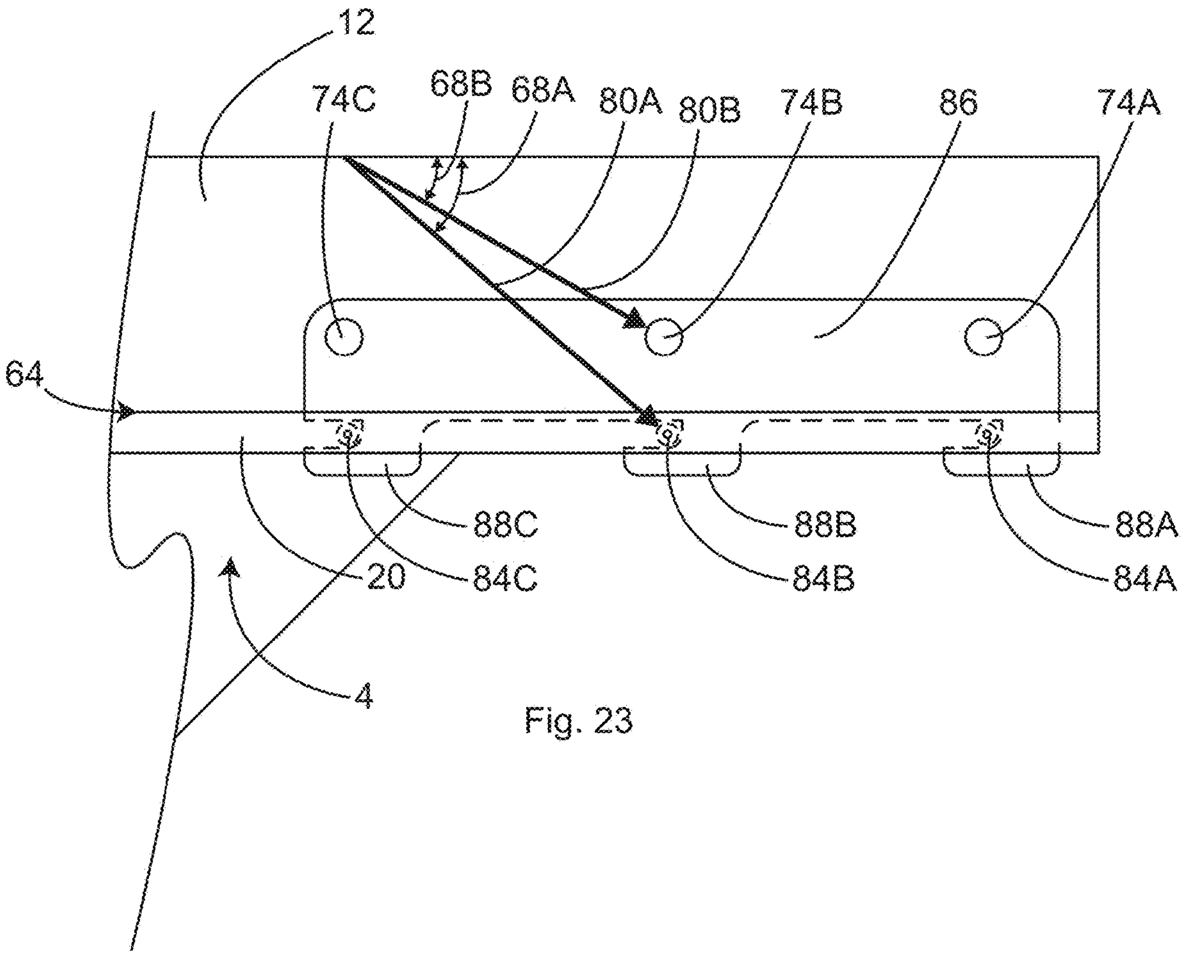
FIG. 23 is a side view of a surgical table, in the Trendelenburg position in accordance with illustrative embodiments.

In some examples as shown in FIGS. 23 and 24, the side flaps 82 may be attached to an attachment bracket 86 instead of attaching to the side rails 20 or the side rail standoff posts 84A, 84B and 84C. In some examples, the attachment might be made with buttons or hooks mounted at attachment points 74A, 74B and 74C on the upper portion of attachment bracket 86. In some examples, attachment bracket 86 may be attached to the surgical table 4 by way of attachment bracket hooks 88A, 88B and 88C, that hook under the side rail standoff posts 84A, 84B and 84C. Attachment bracket hooks 88A, 88B and 88C may be any shape that can generally hook under and engage one or more of the side rail standoff posts 84A, 84B and 84C. In some examples, attachment bracket 86 may be attached to the surgical table 4 by any form of hooks, clamps or straps that attached directly to the side rails 20 or side rail standoff posts 84A, 84B and 84C.

In some examples, attachment bracket 86 may be made of sheet metal such as stainless steel or aluminum. In some examples, attachment bracket 86 may be made of molded or die-cut plastic. In some examples, attachment bracket 86 may be made of carbon fiber or fiberglass reinforced plastic. The plastic attachment brackets 86 have the advantage of being radiolucent—they are invisible to x-ray. In some examples, attachment bracket 86 may be any shape and height that is suitable to bridge between two or more side rail standoff posts 84A, 84B and 84C (or corresponding side rail) and have two or more attachment points 74A, 74B and 74C.

In some examples, the attachment points 74A, 74B and 74C may be the side rail standoff posts 84A, 84B and 84C. In some examples, the attachment points 74A, 74B and 74C may be the side rails 20. In some examples, the attachment points 74A, 74B and 74C may be mounting brackets or clamps attached to the side rail standoff posts 84A, 84B and 84C. In some examples, the attachment points 74A, 74B and 74C may be mounting brackets or clamps attached to the side rails 20.

In some examples, side flaps 82 may include side flap holes 90A, 90B and 90C which may be buttonholes positioned to engage with the buttons or hooks mounted at attachment points 74A, 74B and 74C on the upper portion of attachment bracket 86. In some examples, the side flap holes 90A, 90B and 90C may be in a tear-drop shape for easy application to the buttons at attachment points 74A, 74B and 74C. In some examples, the tear-drop shaped holes may be positioned with the pointed end of the tear-drop shape aimed toward the force vector 80A, 80B and 80C that is directed at the attachment points 74A, 74B and 74C, and the stronger rounded end of the tear-drop shape positioned against the button, in order to minimize the possibility of the side flap 82 material tearing against the buttons or hooks.

In some examples as shown in FIG. 23, when the attachment points 74A, 74B and 74C are raised above the side rails 20 by mounting them along the upper portion of attachment bracket 86, the retaining force vector angles 68 are reduced by approximately half, from 68A to 68B. The reduced retaining force vector angle at 68B compared to 68A (attachment to the side rail) gives a more favorable force vector 80B (closer to the optimal 0° retaining force vector angle), for resisting the weight of a patient sliding down the surgical table 4 in the Trendelenburg position.

Figure 25:
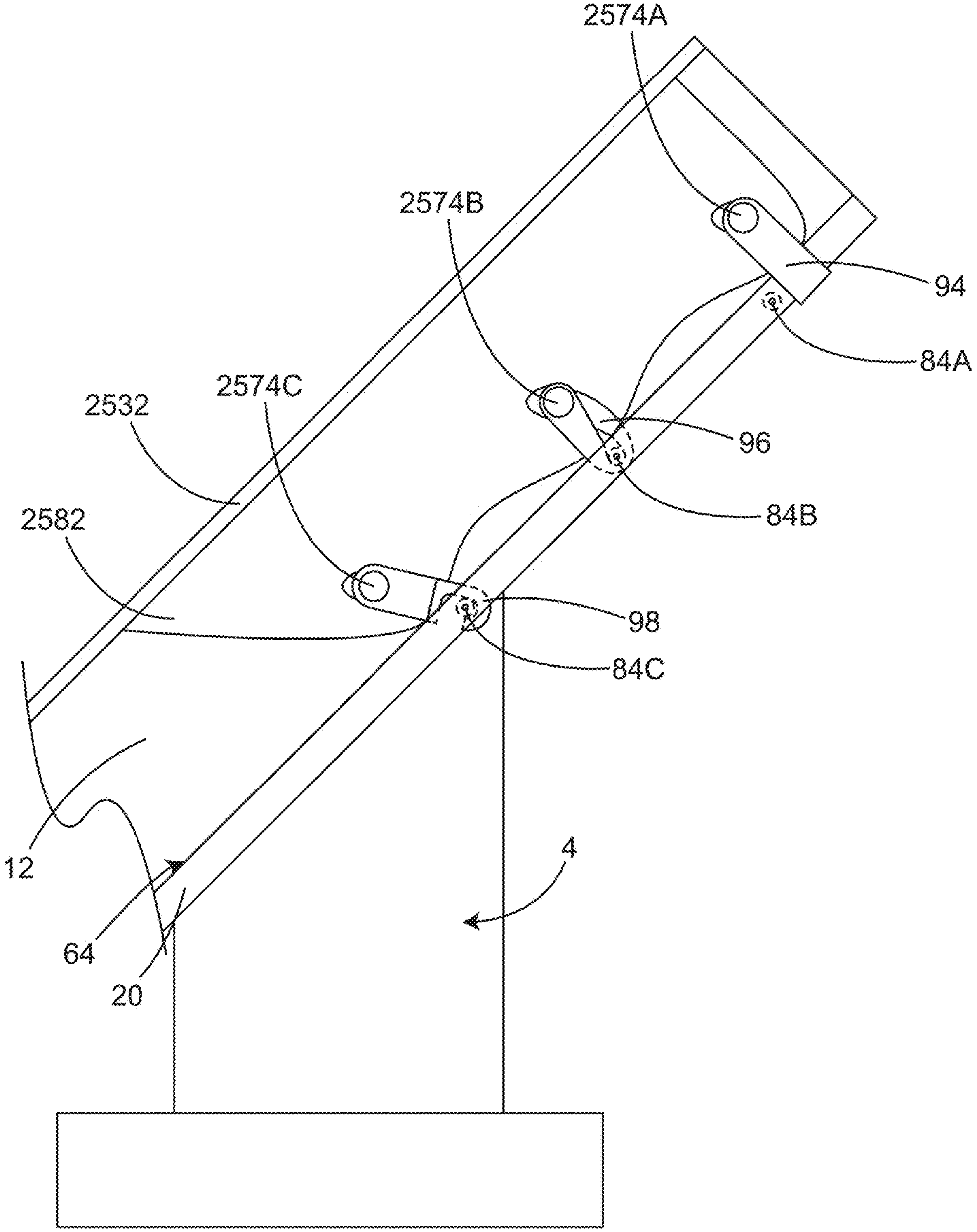
FIG. 25 is a side view of a surgical table and securement pad, in the Trendelenburg position in accordance with illustrative embodiments.

In some examples as shown in FIG. 25, other mechanisms of attaching the side flaps 2582 to the surgical table are anticipated. In some examples, strap 94 may be used to attach attachment point 2574A to the side rail 20. In some examples, strap 96 may be used to attach attachment point 2574B to the side rail standoff post 84B. In some examples, strap 96 may be secured by buttons, hooks, snaps or hook and loop (Velcro), and other attachment mechanisms are anticipated. In some examples, strap 98 may be used to attach attachment point 2574C to the side rail standoff post 84C by way of a plastic or metal hook and other attachment mechanisms are anticipated.

In some examples, when the side flaps 82 are secured to the side rail standoff posts 84 or side rails 20, the sheet of fabric 32 on the top of the mattress 12 is gently stretched and forcefully secured from side to side. This security may be advantageous when the patient is getting onto the surgical table 4 or being repositioned on the surgical table 4. Anything under the patient, especially if it has friction enhancing elements such as foam, can easily bunch up or wrinkle during positioning or repositioning. Anything under the patient that inadvertently bunches up or wrinkles and goes unnoticed for a prolonged period of time during surgery, can cause a pressure injury to the patient's skin. Securing the sheet of fabric 32 from side to side prevents bunching up or wrinkling and therefore reduces the risk of pressure injuries.

This disclosure has focused on patient securement in the Trendelenburg (head down) surgical position. It must be noted that the securement mechanism of this disclosure applies to other surgical positioning as well.

For example, it is anticipated in this disclosure that patients in the reverse Trendelenburg position (head up), which may be used during bariatric gastric surgery for example, can also be secured to the surgical table and prevented from sliding off the foot end of the surgical table. Similar to the Trendelenburg position, the patient lays on a sheet of fabric 32 that includes friction enhancing elements 34. In some examples, the sheet of fabric 32 may be secured to the surgical table by side flaps 82. In some examples, in contrast to the side flaps 82 in the Trendelenburg position, the side flaps 82 in the reverse Trendelenburg position may be attached near the head end of the sheet of fabric 32. The various options disclosed in this disclosure for attaching the side flaps 82 to the side rail standoff posts 84 or side rails 20, including the attachment brackets 86, can be used for attaching the side flaps 82 to the side rail standoff posts 84 or side rails 20 in the reverse Trendelenburg position.

Our experience has shown that the sheet of fabric 32 that includes friction enhancing elements 34 of this disclosure, can be too effective when engaging the skin of the buttocks of a patient in the reverse Trendelenburg position. As gravity pulls the patient toward the foot end in the reverse Trendelenburg position, the fat and skin of the buttocks engaged with the friction enhancing elements 34, can be rolled up and under the lower back when the patient shifts toward the foot end, which can cause damage to the skin of the buttocks. To prevent this from occurring, the friction enhancing elements 34 may be limited to the patients back (not buttocks), during reverse Trendelenburg positioning. In some examples, this can be accomplished by shortening the sheet of fabric 32 that includes friction enhancing elements 34 so that it ends above the buttocks, leaving the buttocks on the relatively slippery sheet normally covering the surgical table. In some examples, the buttocks can be protected by adding a layer of low friction material such as a non-woven fabric, over the portion of the sheet of fabric 32 that includes friction enhancing elements 34, in the area that would be expected to engage with the patient's buttocks.

In some examples, it is anticipated in this disclosure that patients on a substantially level surgical table experiencing leg distraction (forceful pulling on the leg), during certain hip and femoral orthopedic surgeries, can also be secured to the surgical table and prevented from sliding off the foot end of the surgical table. Traditionally, this sliding was prevented by placing a padded post in the patient's groin, between their legs.

However, the posts are frequently in the surgeon's way during surgery and can cause pressure injuries to the perineal nerve and genitals. There is a trend toward "postless" securement in orthopedics, using friction-based securement devices against the patient's back instead of a post between the legs.

Similar to the reverse Trendelenburg position, in some examples, the orthopedic patient lays on a sheet of fabric 32 that includes friction enhancing elements 34. In some examples, the sheet of fabric 32 may be secured to the surgical table by side flaps 82. In some examples, the side flaps 82 for postless orthopedic positioning may be attached near the head end of the sheet of fabric 32. The various options disclosed in this disclosure for attaching the side flaps 82 to the side rail standoff posts 84 or side rails 20, including the attachment brackets 86, can be used for attaching the side flaps 82 to the side rail standoff posts 84 or side rails 20 in postless orthopedic positioning. The securement device of this disclosure prevents the patient from slipping toward the foot end of the surgical table when a distraction force is applied to the leg.

In some examples, it is anticipated in this disclosure that patients undergoing robotic heart surgery or other surgeries requiring a sideways tilt, can benefit from using the securement device of this disclosure. Robotic heart surgery frequently requires that the patient be tilted sideways, usually to the right, in order for the robotic scopes and instruments to have a better entrance angle through the left chest wall. At steep tilt angles, patients may slip sideways on the surgical table if not properly secured.

Similar to the reverse Trendelenburg position, the cardiac surgery patient lays on a sheet of fabric 32 that includes friction enhancing elements 34. In some examples, the sheet of fabric 32 may be secured to the surgical table by side flaps 82. In some examples, the side flaps 82 for robotic cardiac surgery positioning may be attached near the head end of the sheet of fabric 32. The various options disclosed in this disclosure for attaching the side flaps 82 to the side rail standoff posts 84 or side rails 20, including the attachment brackets 86, can be used for attaching the side flaps 82 to the side rail standoff posts 84 or side rails 20 in robotic cardiac surgery positioning. The securement device of this disclosure prevents the patient from slipping toward the side of the surgical table when the table is tilted to the side.

In some examples, the securement device of this disclosure includes a perineal drape 106 as shown in FIG. 16. In some examples, the perineal drape 106 is a sheet of plastic film approximately the width of the surgical table. It attaches near the foot end of the sheet of fabric 32 on either the upper or lower side of the sheet of fabric 32 and then hangs down off the foot end of the surgical table. In some examples, it may be preferable to attach the perineal drape 106 under the sheet of fabric 32 and under the patient's buttocks to prevent blood and fluids from the surgery, from contaminating the surgical table and mattress. In some examples, the perineal drape 106 may be made of thin (<0.004 in.) plastic film such as polyethylene or PVC. In some examples, the perineal drape 106 may be attached to the sheet of fabric 32 by RF bonding, heat bonding or adhesive bonding.

Whereas particular embodiments of the invention have been described for the purposes of illustration, it will be evident to those skilled in the art that numerous variations of the details may be made without departing from the invention as set forth in the embodiments described herein.

Glossary

2 patient
4 surgical table
6 stirrups
8 foot end (of the surgical table)
10 foot end (of the section of the surgical table mattress that supports the patient's torso) (or foot end of the underbody support)
12 section of the surgical table mattress (that supports the patient's torso)
14 perineal cutout
16 underbody support
18 straps
20 side rails
22 strap attachment protrusions
24 perimeter weld 26 securement pads
28 pad straps
30 surgical table mattress
32 sheet of fabric
34 friction-enhancing elements
36 upper surface (of the sheet of fabric)
38 lower surface (of the sheet of fabric)
40 holes or uncoated spaces (in the sheet of fabric)
42 scrim
44 threads
46 open spaces
48 additional threads
50 flattened friction-enhancing elements
52 layer of foam material
54 patient securement overlay
56 side extension (of the foot end of the section of the surgical table mattress that supports the patient's torso)
58 foot end extension
60 head end extension
62 head end (of the section of the surgical table mattress that supports the patient's torso)
64 surgical table top

What is claimed is:

1. A patient securing overlay with securement to a surgical table for use during surgery requiring the surgical table to be significantly tilted, the patient securing overlay comprising:
- a sheet configured to support a patient's torso on a surgical table;
- the sheet having an upper surface configured to face the patient and a lower surface configured to face the surgical table or an underbody support;
- the sheet including friction enhancing elements applied to at least a portion of the upper surface;
- the sheet is attached near its side edges to two or more side flaps that extend laterally outward from the side edges of the sheet;
- each of the side flaps having a head end and being adapted to attach to the surgical table at one or more attachment points via a corresponding attachment bracket;
- each of the attachment points comprising a buttonhole in the side flap that corresponds with a button or hook on the corresponding attachment bracket; and
- each attachment bracket being adapted to attach to a side rail standoff post or a side rail of the surgical table;
- wherein, for each of the two or more side flaps, a length of a line extending perpendicularly from a side edge of the sheet to at least one attachment point of the side flap is less than a distance between the point of the perpendicular line's intersection with the sheet and the head end of the side flap in order to naturally create a favorable retaining force vector angle of less than 45° between the attachment point and the sheet at the head end of the side flap.

2. The patient securing overlay of claim 1, wherein the sheet comprises a woven or non-woven fabric, a plastic film or a fabric-reinforced plastic film.

3. The patient securing overlay of claim 1, wherein the side flaps are made of a woven or non-woven fabric, a plastic film or a fabric-reinforced plastic film.

4. The patient securing overlay of claim 1, wherein the friction enhancing elements include a foam material or elastomer applied to the sheet.

5. The patient securing overlay of claim 1, wherein the friction enhancing elements include a foam layer bonded to the sheet.

6. The patient securing overlay of claim 1, wherein the sheet is larger than an area defined by the friction enhancing elements.

7. The patient securing overlay of claim 1, wherein the friction enhancing elements include a layer of foam, and wherein the sheet is smaller than an area defined by the friction enhancing elements.

8. The patient securing overlay of claim 1, wherein the side flaps are RF bonded or heat bonded to the sheet.

9. The patient securing overlay of claim 1, wherein the side flaps and the sheet are made of a same material, and wherein the side flaps are sewn or adhesive bonded to the sheet.

10. The patient securing overlay of claim 1, wherein the side flaps and the sheet are made of a same material, and wherein the side flaps are contiguous with the sheet.

11. The patient securing overlay of claim 1, wherein each attachment bracket is attached to a side rail standoff post of the surgical table by a hook-like mechanism.

12. The patient securing overlay of claim 1, wherein each attachment bracket is clamped to a side rail standoff post or a side rail of the surgical table.

13. The patient securing overlay of claim 1, wherein the buttonholes in the side flaps are teardrop-shaped with the pointed end of the teardrop shape aligned with the retaining force vector.

14. A patient securing overlay with securement to a surgical table for use during surgery requiring the surgical table to be significantly tilted, the patient securing overlay comprising:
- a sheet configured to support a torso of a patient on a surgical table;
- the sheet having an upper surface configured to face the patient and a lower surface configured to face the surgical table or an underbody support;
- the sheet including friction enhancing elements applied to at least a portion of the upper surface;
- the sheet being attached near its side edges to two or more side flaps that extend laterally outward from the side edges of the sheet;
- each of the side flaps having a head end and being adapted to attach to the surgical table via a corresponding attachment bracket at one or more attachment points;
- each of the attachment points comprising a buttonhole in the side flap that corresponds with a button or hook on the corresponding attachment bracket; and
- each attachment bracket is adapted to attach to a side rail standoff post or side rail of the surgical table;
- wherein, for each side flap, a distance between at least one attachment point on the side flap and the head end of the side flap is greater than a length of a portion of the side flap extending between the at least one attachment point and the sheet in order to naturally create a favorable retaining force vector angle of less than 45° between the attachment point and the sheet at the head end of the side flap.

15. A patient securing overlay with securement to a surgical table for use during surgery requiring the surgical table to be significantly tilted, the patient securing overlay comprising:
- a sheet configured to support a torso of a patient on a surgical table;
- the sheet having an upper surface configured to face the patient and a lower surface configured to face the surgical table or an underbody support;
- the sheet including friction enhancing elements applied to at least a portion of the upper surface;

the sheet is attached near its side edges to two or more side flaps that extend laterally outward from the side edges of the sheet; and each of the side flaps are configured to be attached to a corresponding attachment bracket, side rail standoff post, or side rail of the surgical table at one or more attachment points;

wherein, for each side flap, a length of a line extending perpendicularly from a side edge of the sheet to at least one attachment point of the side flap is less than a distance between the point of the perpendicular line's intersection with the sheet and a head end of the side flap in order to naturally create a favorable retaining force vector angle of less than 45° between the attachment point and the sheet.

16. The patient securing overlay of claim 15, wherein the sheet comprises a woven or non-woven fabric, a plastic film or a fabric-reinforced plastic film.

17. The patient securing overlay of claim 15, wherein the side flaps are made of a woven or non-woven fabric, a plastic film or a fabric-reinforced plastic film.

18. The patient securing overlay of claim 15, wherein the friction enhancing elements include a foam material or elastomer applied to the sheet.

19. The patient securing overlay of claim 15, wherein the friction enhancing elements include a foam layer bonded the sheet.

20. The patient securing overlay of claim 15, wherein the sheet is larger than an area defined by the friction enhancing elements.

21. The patient securing overlay of claim 15, wherein the friction enhancing elements include a layer of foam, and wherein the sheet is smaller than an area defined by the friction enhancing elements.

22. The patient securing overlay of claim 15, wherein the side flaps are RF bonded or heat bonded to the sheet.

23. The patient securing overlay of claim 15, wherein the side flaps and the sheet are made of different materials, and wherein the side flaps are sewn or adhesive bonded to the sheet.

24. The patient securing overlay of claim 15, wherein the side flaps are contiguous with the sheet.

25. The patient securing overlay of claim 15, wherein the attachment points of the side flaps are attached to a corresponding attachment bracket with an attachment mechanism selected from the group consisting of: buttons and buttonholes, snaps, hooks, hook and loop, straps, clamps, and any combination thereof.

26. The patient securing overlay of claim 25, wherein the buttonholes in the side flaps are teardrop-shaped with the pointed end of the teardrop shape aligned with the retaining force vector.

27. The patient securing overlay of claim 15, wherein the attachment points of the side flaps are attached to side rail standoff posts or side rails of the surgical table with an attachment mechanism selected from the group consisting of: buttons and buttonholes, snaps, hooks, hook and loop, straps, clamps, and any combination thereof.

28. The patient securing overlay of claim 15, wherein the attachment points of the side flaps are attached to a corresponding attachment bracket and each attachment bracket is attached to a side rail standoff post of the surgical table by a hook-like mechanism.

29. The patient securing overlay of claim 15, wherein the attachment points of the side flaps are attached to a corresponding attachment bracket and each attachment bracket is clamped to a side rail standoff post or a side rail of the surgical table.

30. A patient securing overlay with securement to a surgical table for use during surgery requiring the surgical table to be significantly tilted, the patient securing overlay comprising:

a sheet configured to support a torso of a patient on a surgical table;

the sheet having an upper surface configured to face the patient and a lower surface configured to face the surgical table or an underbody support;

the sheet including friction enhancing elements applied to at least a portion of the upper surface;

the sheet being attached near its side edges to two or more side flaps that extend laterally outward from the side edges of the sheet; and each of the side flaps are configured to be attached to an attachment bracket or a side rail standoff post or a side rail of the surgical table at one or more attachment points;

wherein, for each side flap, a distance extending between at least one attachment point and a head end of the side flap is greater than a length of a portion of the side flap extending between the at least one attachment point and the sheet in order to naturally create a favorable retaining force vector angle of less than 45° between the attachment point and the sheet at the head end of the side flap.

* * * * *